United States Patent
Das Sharma et al.

(10) Patent No.: US 12,189,470 B2
(45) Date of Patent: Jan. 7, 2025

(54) FORWARD ERROR CORRECTION AND CYCLIC REDUNDANCY CHECK MECHANISMS FOR LATENCY-CRITICAL COHERENCY AND MEMORY INTERCONNECTS

(71) Applicant: Intel Corporation, Santa Clara, CA (US)

(72) Inventors: Debendra Das Sharma, Saratoga, CA (US); Swadesh Choudhary, Mountain View, CA (US)

(73) Assignee: Intel Corporation, Santa Clara, CA (US)

(*) Notice: Subject to any disclaimer, the term of this patent is extended or adjusted under 35 U.S.C. 154(b) by 654 days.

(21) Appl. No.: 17/134,240

(22) Filed: Dec. 25, 2020

(65) Prior Publication Data

US 2021/0119730 A1    Apr. 22, 2021

Related U.S. Application Data

(60) Provisional application No. 63/080,497, filed on Sep. 18, 2020.

(51) Int. Cl.
*G06F 11/10* (2006.01)
*H04L 1/00* (2006.01)

(52) U.S. Cl.
CPC ........ *G06F 11/1004* (2013.01); *H04L 1/0041* (2013.01)

(58) Field of Classification Search
CPC ........... H04L 1/0041; H04L 2001/0098; H04L 1/0009; H04L 1/0017; H04L 1/0045; H04L 1/0057; H04L 1/0061; G06F 11/1004
See application file for complete search history.

(56) References Cited

U.S. PATENT DOCUMENTS 5,600,662 A * 2/1997 Zook ..................... H03M 13/17
360/49
6,400,728 B1    6/2002 Ott
(Continued)

FOREIGN PATENT DOCUMENTS

CN    105721057 A    6/2016
CN    108306915 A    7/2018
(Continued)

OTHER PUBLICATIONS

V. Taraka Sai Srinatha Reddy, G. Hema Sekhar Reddy, K. Jeshmitha Reddy and M. Vinodhini, "Fast Error Correction for Header Flit in NoC," 2019 International Conference on Communication and Electronics Systems (ICCES), Coimbatore, India, 2019.*
(Continued)

*Primary Examiner* — Steve N Nguyen
(74) *Attorney, Agent, or Firm* — Alliance IP, LLC

(57) ABSTRACT

Systems, methods, and apparatuses can include transmission-side protocol stack circuitry comprising first cyclic redundancy check (CRC) circuitry to determine first CRC code for a first set of information and to determine second CRC code for a second set of information; and Flit encoding circuitry to encode a first portion of a Flit with the first set of information and the first CRC code, the Flit encoding circuitry to encode a second portion of the Flit with the second set of information and the second CRC code. Receiver-side protocol stack circuitry can include a low-latency path comprising first CRC check circuitry to perform a CRC check on a first portion of a received Flit. Receiver-side protocol stack circuitry can include a non-low-latency path comprising forward error correction (FEC) decoder circuitry to perform FEC on received Flits, and second CRC check circuitry to perform CRC check on received Flits that pass FEC.

23 Claims, 18 Drawing Sheets

(56) References Cited

U.S. PATENT DOCUMENTS

| | | |
|---|---|---|
| 6,411,654 B1 | 6/2002 | Furutani et al. |
| 6,590,882 B1 | 7/2003 | Fong et al. |
| 6,684,363 B1* | 1/2004 | Cassiday ............... H04L 1/0041 |
| | | 714/776 |
| 7,124,333 B2 | 10/2006 | Fukushima et al. |
| 7,127,653 B1 | 10/2006 | Gorshe |
| 7,958,431 B2 | 6/2011 | Hollums |
| 7,995,696 B1 | 8/2011 | Norrie |
| 8,023,530 B1 | 9/2011 | Giallorenzi et al. |
| 8,400,728 B2 | 3/2013 | Thompson et al. |
| 8,417,847 B2 | 4/2013 | McNutt et al. |
| 8,446,921 B2 | 5/2013 | Chen |
| 8,463,962 B2 | 6/2013 | Murari |
| 8,824,581 B2 | 9/2014 | Okada |
| 9,311,268 B1 | 4/2016 | Chen et al. |
| 9,396,152 B2 | 7/2016 | Pethe et al. |
| 9,971,730 B2 | 5/2018 | Remple et al. |
| 10,114,790 B2 | 10/2018 | Hanchinal et al. |
| 10,180,875 B2* | 1/2019 | Klein .................. G06F 11/1072 |
| 10,210,040 B2 | 2/2019 | Circello et al. |
| 10,250,436 B2 | 4/2019 | Sharma |
| 10,360,098 B2* | 7/2019 | Willey ................. G06F 13/4221 |
| 10,372,647 B2 | 8/2019 | Lovett et al. |
| 10,771,189 B2 | 9/2020 | Sharma |
| 10,784,986 B2 | 9/2020 | Sharma |
| 11,153,032 B2 | 10/2021 | Sharma |
| 11,429,553 B2 | 8/2022 | Sharma |
| 11,595,318 B2 | 2/2023 | Sharma |
| 2003/0110422 A1 | 6/2003 | Naffziger et al. |
| 2003/0188254 A1 | 10/2003 | Lusky et al. |
| 2003/0198252 A1 | 10/2003 | Thrysoe |
| 2004/0098655 A1* | 5/2004 | Sharma ............... H03M 13/091 |
| | | 714/758 |
| 2004/0264960 A1 | 12/2004 | Maciocco et al. |
| 2005/0063701 A1 | 3/2005 | Ovadia et al. |
| 2005/0138524 A1 | 6/2005 | Cioffi |
| 2005/0160346 A1 | 7/2005 | Yamane |
| 2005/0172091 A1 | 8/2005 | Rotithor et al. |
| 2005/0193312 A1 | 9/2005 | Smith et al. |
| 2006/0123328 A1 | 6/2006 | Tonami et al. |
| 2007/0098007 A1 | 5/2007 | Prodan et al. |
| 2007/0229327 A1 | 10/2007 | Chen et al. |
| 2008/0008471 A1* | 1/2008 | Dress ...................... G06E 3/006 |
| | | 398/118 |
| 2008/0140686 A1 | 6/2008 | Hong et al. |
| 2008/0141095 A1 | 6/2008 | Cai et al. |
| 2009/0201805 A1 | 8/2009 | Begen et al. |
| 2009/0241009 A1 | 9/2009 | Kong et al. |
| 2009/0276686 A1 | 11/2009 | Liu et al. |
| 2010/0036997 A1 | 2/2010 | Brewer et al. |
| 2010/0229071 A1 | 9/2010 | Ganga et al. |
| 2011/0099411 A1 | 4/2011 | Lin |
| 2011/0134909 A1 | 6/2011 | Huang et al. |
| 2011/0138258 A1 | 6/2011 | Okamura et al. |
| 2011/0219279 A1 | 9/2011 | Abu-Surra et al. |
| 2011/0243154 A1 | 10/2011 | Flynn et al. |
| 2012/0119753 A1 | 5/2012 | Kim |
| 2012/0137184 A1 | 5/2012 | Nakamura |
| 2012/0240017 A1 | 9/2012 | Uchida |
| 2012/0314965 A1 | 12/2012 | Yamamoto et al. |
| 2013/0080859 A1 | 3/2013 | Cloetens |
| 2013/0246878 A1 | 9/2013 | Pancholi et al. |
| 2014/0006677 A1 | 1/2014 | Iyer et al. |
| 2014/0112339 A1 | 4/2014 | Safranek et al. |
| 2014/0114887 A1 | 4/2014 | Iyer et al. |
| 2014/0115374 A1 | 4/2014 | Iyer et al. |
| 2014/0115420 A1 | 4/2014 | Willey et al. |
| 2014/0122963 A1 | 5/2014 | Motwani et al. |
| 2014/0126580 A1 | 5/2014 | Sampath et al. |
| 2014/0372658 A1 | 12/2014 | Safranek et al. |
| 2015/0103822 A1* | 4/2015 | Gianchandani ......... H04L 69/08 |
| | | 370/389 |
| 2015/0163170 A1 | 6/2015 | Birrittella |
| 2015/0222533 A1 | 8/2015 | Birrittella et al. |
| 2015/0256288 A1 | 9/2015 | Tanaka et al. |
| 2015/0280746 A1 | 10/2015 | Sikkink et al. |
| 2015/0309873 A1 | 10/2015 | Yoon et al. |
| 2015/0347015 A1 | 12/2015 | Pawlowski |
| 2016/0085619 A1 | 3/2016 | Iyer et al. |
| 2016/0099795 A1 | 4/2016 | Lusted et al. |
| 2016/0179427 A1 | 6/2016 | Jen et al. |
| 2016/0179610 A1 | 6/2016 | Morris et al. |
| 2016/0179647 A1 | 6/2016 | Sharma et al. |
| 2016/0179710 A1 | 6/2016 | Sharma et al. |
| 2016/0179718 A1 | 6/2016 | Morris et al. |
| 2016/0179730 A1 | 6/2016 | Halleck et al. |
| 2016/0182265 A1 | 6/2016 | Shulman et al. |
| 2016/0248682 A1 | 8/2016 | Lee et al. |
| 2016/0261375 A1 | 9/2016 | Roethig et al. |
| 2016/0283112 A1 | 9/2016 | Blankenship |
| 2016/0283303 A1 | 9/2016 | Sharma et al. |
| 2016/0283375 A1 | 9/2016 | Sharma et al. |
| 2016/0283388 A1 | 9/2016 | Blankenship et al. |
| 2016/0283399 A1 | 9/2016 | Sharma |
| 2016/0337079 A1 | 11/2016 | Ran |
| 2016/0373557 A1* | 12/2016 | Sikkink ................. H04L 69/324 |
| 2016/0377679 A1 | 12/2016 | Froelich et al. |
| 2017/0004098 A1 | 1/2017 | Sharma et al. |
| 2017/0017604 A1 | 1/2017 | Chen et al. |
| 2017/0034165 A1 | 2/2017 | Bagal et al. |
| 2017/0141794 A1* | 5/2017 | Tyson .................. H03M 13/091 |
| 2017/0163286 A1 | 6/2017 | Wu et al. |
| 2017/0222686 A1 | 8/2017 | Khan et al. |
| 2017/0270062 A1 | 9/2017 | Sharma |
| 2017/0351795 A1 | 12/2017 | Ghattas et al. |
| 2018/0004686 A1 | 1/2018 | Chen |
| 2018/0083855 A1 | 3/2018 | Weiny et al. |
| 2018/0095921 A1* | 4/2018 | Lambrecht .......... G06F 13/1678 |
| 2018/0095923 A1 | 4/2018 | Iyer et al. |
| 2018/0191523 A1 | 7/2018 | Shah et al. |
| 2018/0196710 A1* | 7/2018 | Iyer ..................... G06F 11/1004 |
| 2018/0205431 A1 | 7/2018 | Nammi |
| 2018/0248650 A1 | 8/2018 | Sharma |
| 2018/0254943 A1 | 9/2018 | Sharma |
| 2019/0095380 A1 | 3/2019 | Sharma |
| 2019/0149265 A1 | 5/2019 | Sharma |
| 2019/0227972 A1 | 7/2019 | Hor et al. |
| 2019/0243700 A1 | 8/2019 | Brewer |
| 2019/0294579 A1 | 9/2019 | Sharma |
| 2019/0305888 A1 | 10/2019 | Sharma |
| 2019/0372904 A1 | 12/2019 | Dress |
| 2020/0012555 A1 | 1/2020 | Sharma |
| 2020/0145341 A1 | 5/2020 | Sharma |
| 2020/0186414 A1 | 6/2020 | Sharma |
| 2020/0226018 A1 | 7/2020 | Sharma |
| 2020/0374037 A1 | 11/2020 | Sharma |
| 2021/0006349 A1 | 1/2021 | Das |
| 2021/0119730 A1 | 4/2021 | Sharma et al. |
| 2021/0224215 A1 | 7/2021 | Sharma |
| 2021/0367900 A1 | 11/2021 | Sharma |
| 2022/0147417 A1 | 5/2022 | Sharma |
| 2023/0056476 A1 | 2/2023 | Sharma |

FOREIGN PATENT DOCUMENTS

| | | |
|---|---|---|
| EP | 1253729 A2 | 10/2002 |
| EP | 2634983 A2 | 9/2013 |
| EP | 3702926 A1 | 9/2020 |
| JP | 2010187244 A | 8/2010 |
| WO | 2015099724 A1 | 7/2015 |
| WO | 2016053519 A1 | 4/2016 |
| WO | 2017014846 A1 | 1/2017 |

OTHER PUBLICATIONS

USPTO; Notice of Allowance issued in U.S. Appl. No. 16/948,459, dated Jun. 10, 2021; 42 pages.

USPTO; Final Office Action issued in U.S. Appl. No. 16/723,868, dated Aug. 26, 2021; 24 pages.

USPTO; Non-Final Office Action issued U.S. Appl. No. 16/575,739; dated Sep. 9, 2021; 27 pages.

USPTO; Notice of Allowance issued in U.S. Appl. No. 16/991,681; dated Sep. 9, 2021; 51 pages.

(56) References Cited

OTHER PUBLICATIONS

Das Sharma, Debendra; "PCI Express 6.0 Specification at 64.0 GT/s with PAM-4 signaling: a low latency, high bandwidth, high reliability and cost-effective interconnect," 2020 IEEE Symposium on High-Performance Interconnects; Aug. 19, 2020; 8 pages.
EPO; Extended European Search Report issued in EP Patent Application No. 21190720.9, dated Feb. 1, 2022; 9 pages.
EPO; Extended European Search Report issued in EP Patent Application No. 21167765.3, dated Jul. 21, 2021; 8 pages [Jul. 21, 2021].
USPTO; Non-Final Office Action issued in U.S. Appl. No. 16/723,868, dated Mar. 29, 2021; 11 pages.
Aguilar, M., et al; "Proposal of Implementation of the 'Data Link Layer' of PCI-Express," ICEEE, 1st International Conference on Electrical and Electronics Engineering, 2004; Mexico, 2004; 6 pages.
EPO; Office Action issued in EP Patent Application No. 20194485.7, dated Jan. 20, 2023; 8 pages.
USPTO; Ex-Parte Quayle Action issued in U.S. Appl. No. 16/831,726, dated Jan. 17, 2023; 8 pages.
USPTO; Non-Final Office Action issued in U.S. Appl. No. 17/580,408, dated Feb. 2, 2023; 13 pages.
USPTO; Notice of Allowance issued in U.S. Appl. No. 17/397,710, dated Oct. 26, 2022; 10 pages.
Chen, Ling-Jyh, et al. "Improving Wireless Link Throughput via Interleaved FEC", Ninth International Symposium on Computers and Communications, Alexandria, Egypt, Jul. 2004, 6 pages.
EPO; Extended European Search Report in EP Application Serial No. 20153760.2, mailed on Mar. 26, 2020 (8 pages).
EPO; Extended European Search Report in EP Application Serial No. 20153970.7, mailed on Mar. 26, 2020 (7 pages).
EPO; Extended European Search Report issued in EP Patent Application No. 18761600.8, dated Dec. 2, 2020; 7 pages.
EPO; Extended European Search Report issued in EP Patent Application No. 20150933.8, dated Jul. 17, 2020; 8 bages.
EPO; Extended European Search Report issued in EP Patent Application No. 20165292.2, dated Jul. 10, 2020; 11 pages.
Feehrer, J., et al., "Implementation and modeling for high-performance I/O Hub used in SPARC M7 processor-based servers", 2015 IEEE 9th International Symposium on Embedded Multicore/Many-core Systems-on-Chip, IEEE, Conference Location: Turin, Italy, Date of Conference: Sep. 23-25, 2015, pp. 275-282. (Year: 2015).
Jiajia Jiao and Yuzhuo Fu, "A cost-effective method for masking transient errors in Noc flit type," 2013 IEEE 10th International Conference on ASIC, Shenzhen, 2013, pp. 1-4. (Year: 2013).
PCT International Preliminary Report on Patentability issued in PCT/US2018/019583, dated Sep. 3, 2019; 12 pages.
PCT International Search Report and Written Opinion in PCT/US2018/019702, mailed on Jun. 4, 2018, 11 pages.
PCT International Search Report and Written Opinion issued in PCT/US2018/019583, dated Jun. 5, 2018; 15 pages.
Srinivasan Murall et al: "Analysis of Error Recovery Schemes for Networks on Chips", IEEE Design & Test of Computers ( vol. 22, Issue: 5, Sep.-Oct. 2005 ), Sep. 26, 2005 (Sep. 26, 2005), pp. 434-442, XP055628862, DOI: 10.1109/MDT.2005.104.
USPTO Final Office Action in U.S. Appl. No. 16/439,582 mailed on May 1, 2020 (12 pages).
USPTO Non-Final Office Action in U.S. Appl. No. 16/439,582 mailed on Sep. 18, 2020 (12 pages).
USPTO Non-Final Office Action mailed Jan. 10, 2020, for U.S. Appl. No. 16/439,582, 11 pages.
USPTO; Corrected Notice of Allowability issued in U.S. Appl. No. 15/640,449, dated Jun. 24, 2020; 6 pages.
USPTO; Non-Final Office Action issued in U.S. Appl. No. 15/446,395, dated Jun. 1, 2018; 5 pages.
USPTO; Non-Final Office Action issued in U.S. Appl. No. 15/640,449; dated Apr. 7, 2020; 10 pages.
USPTO; Non-Final Office Action issued in U.S. Appl. No. 16/575,739, dated Jan. 7, 2021; 21 pages.
USPTO; Non-Final Office Action issued in U.S. Appl. No. 16/224,583, dated Apr. 8, 2020; 18 pages.
USPTO; Notice of Allowance issued in U.S. Appl. No. 15/446,395, dated Nov. 21, 2018; 8 pages.
USPTO; Notice of Allowance issued in U.S. Appl. No. 15/640,449, dated May 11, 2020; 6 pages.
USPTO; Notice of Allowance issued in Patent Application No. U.S. Appl. No. 16/439,582, dated Jan. 12, 2021; 9 pages.
USPTO; Notice of Allowance issued in U.S. Appl. No. 16/224,583, dated May 12, 2020; 6 pages.
Yao, Jun, et al., "PCIe Gen4 Standards Margin Assisted Outer Layer Equalization for Cross Lane Optimization in a 16GT/s PCIe Link", retrieved from the internet at https://www.researchgate.net/publication/316009959; DesignCon, Santa Clara, California; Feb. 2017; 27 pages.
EPO; Extended European Search Report issued in EP Patent Application No. 20194485.7, dated Mar. 1, 2021; 9 pages.
India Patent Office; Office Action issued in IN Patent Application No. 202044010345, dated Nov. 5, 2021; 6 pages including English translation.
PCT International Search Report and Written Opinion issued in PCT/US2021/045785, dated Nov. 24, 2021; 10 pages.
EPO; Notice of Intention to Grant issued in EP Patent Application No. 20150933.8, dated Feb. 25, 2022; 6 pages.
USPTO; Non-Final Office Action issued in U.S. Appl. No. 16/428,841, dated Mar. 7, 2022; 13 pages.
EPO; Extended European Search Report issued in EP Patent Application No. 20217123.7, dated Oct. 6, 2021; 13 pages.
USPTO; Notice of Allowance issued in U.S. Appl. No. 16/575,739; dated Oct. 5, 2021; 35 pages.
EPO; Extended European Search Report issued in EP Patent Application No. 21150857.7, dated Jul. 13, 2021; 13 pages.
USPTO; Non-Final Office Action issued in U.S. Appl. No. 16/428,841, dated Aug. 6, 2021; 9 pages.
EPO; Office Action issued in EP Patent Application No. 21150857.7, dated Dec. 7, 2022; 7 pages.
USPTO; Notice of Allowance issued in U.S. Appl. No. 16/428,841, dated Dec. 13, 2022; 8 pages.
EPO; Extended European Search Report issued in EP Patent Application No. 23201245.0, dated Apr. 25, 2024; 12 pages.
EPO; Office Action issued in EP Patent Application No. 20194485.7, dated Jun. 26, 2024; 8 pages.
SIPO; First Office Action issued in CN Patent Application No. 202110058148.0, dated Jun. 14, 2024; 22 pages including English translation.

* cited by examiner

FORWARD ERROR CORRECTION AND CYCLIC REDUNDANCY CHECK MECHANISMS FOR LATENCY-CRITICAL COHERENCY AND MEMORY INTERCONNECTS

CROSS REFERENCE TO RELATED APPLICATION

Pursuant to 35 U.S.C. § 119(e), this application claims the benefit of U.S. Provisional Patent Application Ser. No. 63/080,497, titled, "FORWARD ERROR CORRECTION AND CYCLIC REDUNDANCY CHECK MECHANISMS FOR LATENCY-CRITICAL COHERENCY AND MEMORY INTERCONNECTS LEVERAGING THE FEC AND CRC MECHANISMS OF PCIE 6.0 WITH PAM-4 SIGNALING," filed on Sep. 18, 2020, the entire contents of which are incorporated by reference herein.

BACKGROUND

As data rates for serial links exceed 32.0 GT/s, Pulse Amplitude Modulation (PAM, such as PAM-4) with Forward Error Correction (FEC) can be used to limit an effective Bit Error Rate (BER) to an acceptable range. Forward Error Correction (FEC) is a technique used for controlling errors in data transmission over unreliable or noisy communication channels. A sender can encode a message in a redundant way by using an error-correcting code (ECC). The redundancy allows the receiver to detect a limited number of errors that may occur anywhere in the message, and often to correct these errors without re-transmission.

Figure 1:
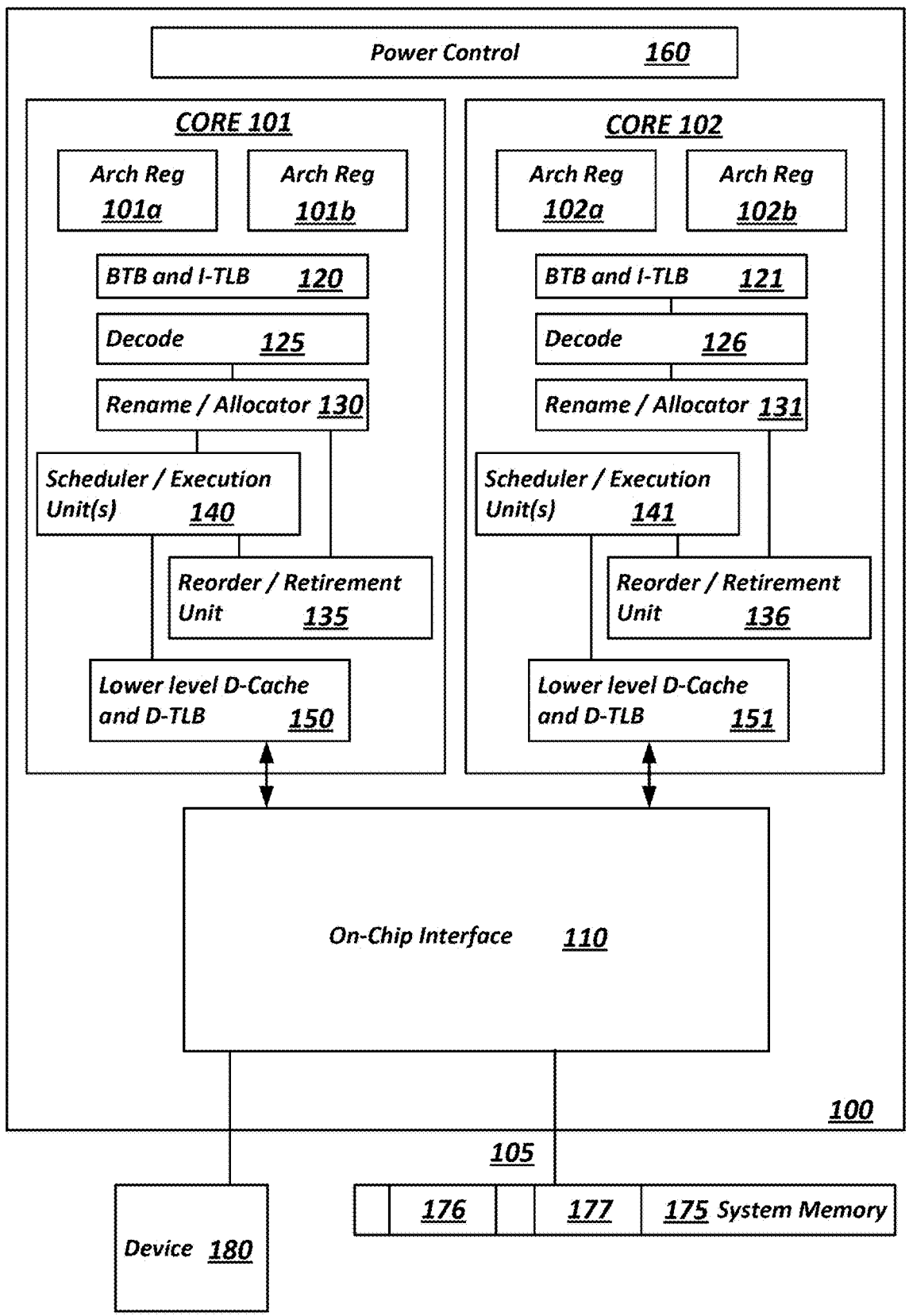
FIG. 1 illustrates an embodiment of a block diagram for a computing system including a multicore processor.

Figure are not drawn to scale.

An order of operations is not implied by the order in which features of the claims appear.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2A:
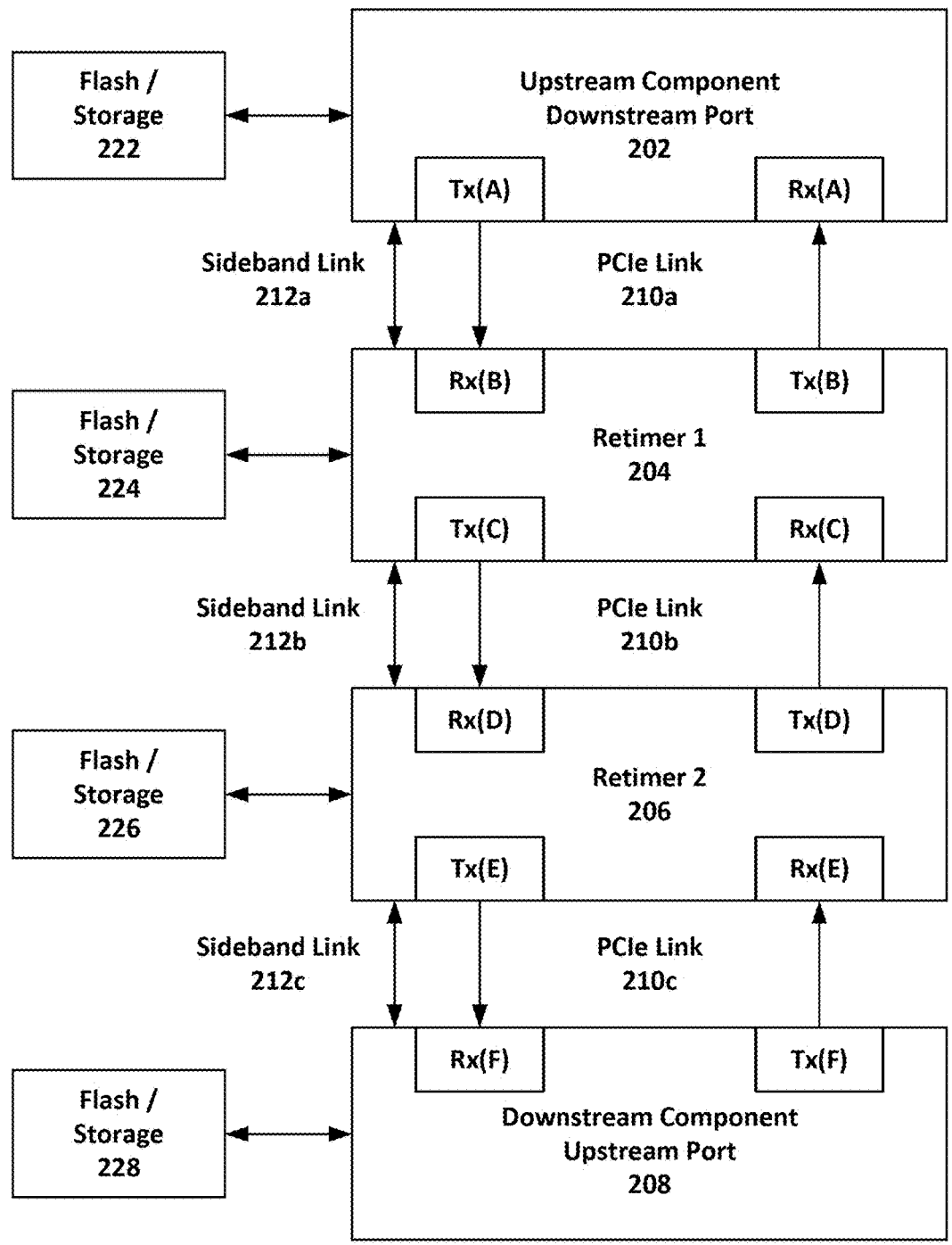
FIGS. 2A-2B are simplified block diagrams of example links that include one or more retimers in accordance with embodiments of the present disclosure.

FIG. 2A is a schematic and timing diagram illustrating a sample topology 200 with two re-timers 204 and 206 between an upstream component downstream port 202 and a downstream component upstream port 208 in accordance with embodiments of the present disclosure. The upstream component downstream port 202 can be a port for a PCIe-based device, such as a CPU or other device capable of generating a data packet and transmitting the data packet across a data Link compliant with the PCIe protocol. The downstream component upstream port 208 can be a port for a peripheral component that can receive a data packet from a Link compliant with the PCIe protocol. It is understood that the upstream component downstream port 202 and the downstream component upstream port 208 can transmit and receive data packets across PCIe Link(s), illustrated as PCIe Link 210a-c.

The topology 200 can include one or more retimers 204 and 206. Retimers 204 and 206 can serve as a signal repeater operating at the physical layer to fine tune the signal from the upstream component 202 and/or the downstream component upstream port 208. A retimer can use Continuous Time Linear Equalization (CTLE), Decision Feedback Equalization (DFE), and transmit an impulse response equalization (Tx FIR EQ, or just TxEQ). Re-timers are transparent to the data Link and transaction layers but implement the full physical layer.

The multi-Lane PCIe Link is split into three Link segments (LS) 210a, 210b, and 210c in each direction. The upstream component downstream port 202 can be coupled to retimer 1 204 by a multi-Lane PCIe Link 210a. The retimer 1 204 can be coupled to retimer 2 206 by link segment 210b. And retimer 2 206 can be coupled to downstream component upstream port 208 by link segment 210c.

Components can also be coupled by sideband linkages. The upstream component downstream port 202 can be coupled to retimer 1 204 by a sideband link 212a. The retimer 1 204 can be coupled to retimer 2 206 by sideband link 212b. And retimer 2 206 can be coupled to downstream component upstream port 208 by sideband link 212c.

A primary function of a retimer (buffer) device is signal re-timing. These functions are performed by retimers 204 and 206. The particular retimer device circuits will depend on the PHY being used for the link. Generally, retimer circuitry is configured to recover the incoming signal and retransmit using a local clock and new transmit equalization circuitry, and may typically employ well-known circuitry for this purpose, such as phase lock loops. A retimer may further comprise transmitter and receiver circuitry including one or more amplifier circuits, as well as various types of well-known signal-conditioning circuitry used to increase the drive level of a received signal. Such retimer circuitry is well-known to those skilled in the high-speed interconnect arts, and, accordingly, no further details are shown or discussed herein.

Each retimer 204 and 206 can have an upstream path and a downstream path. In some implementations, a retimer can include two pseudo ports, and the pseudo ports can determine their respective downstream/upstream orientation dynamically. Further, retimers 204 and 206 can support operating modes including a forwarding mode and an executing mode. Retimers 204 and 206 in some instances can decode data received on the sub-link and re-encode the data that it is to forward downstream on its other sublink. As such, retimers may capture the received bit stream prior to regenerating and re-transmitting the bit stream to another device or even another retimer (or redriver or repeater). In some cases, the retimer can modify some values in the data it receives, such as when processing and forwarding ordered set data. Additionally, a retimer can potentially support any width option as its maximum width, such as a set of width options defined by a specification such as PCIe.

As data rates of serial interconnects (e.g., PCIe, UPI, USB, etc.) increase, retimers are increasingly used to extend the channel reach. Multiple retimers can be cascaded for even longer channel reach. It is expected that as signal speeds increase, channel reach will typically decrease as a general matter. Accordingly, as interconnect technologies accelerate, the use of retimers may become more common. As an example, as PCIe Gen-4, with its 16 GT/s, is adopted in favor of PCIe Gen-3 (8 GT/s), the use of retimers in PCIe interconnects may increase, as may be the case in other interconnects as speeds increase.

In one implementation, a common BGA (Ball Grid Array) footprint may be defined for PCI Express Gen-4 (16 GT/s) based retimers. Such a design may address at least some of the example shortcomings found in conventional PCIe Gen-3 (8 GT/s) retimer devices, as well as some of the issues emerging with the adoption of PCIe Gen-4. Further, for PCIe Gen-4, the number of retimer vendors and volume are expected to increase. Due to signal losses from the doubled data rate (from 8 GT/s to 16 GT/s), the interconnect length achievable is significantly decreased in Gen-4. In this and other example interconnect technologies, as data rate increases, retimers may thereby have increased utility as they can be used to dramatically increase channel lengths that would be otherwise constrained by the increased data rate.

Although shown to be separate from the upstream component and downstream component, the retimer can be part of the upstream or downstream components, on board with the upstream or downstream components, or on package with the downstream component.

The upstream component downstream port 202 can have access to a storage element 222, such as a flash storage, cache, or other memory device. The retimer 1 204 can optionally include a similar storage element 224. The retimer 2 206 can optionally include a similar storage element 226. The downstream component upstream port 208 can optionally include a similar storage element 228.

Figure 2B:
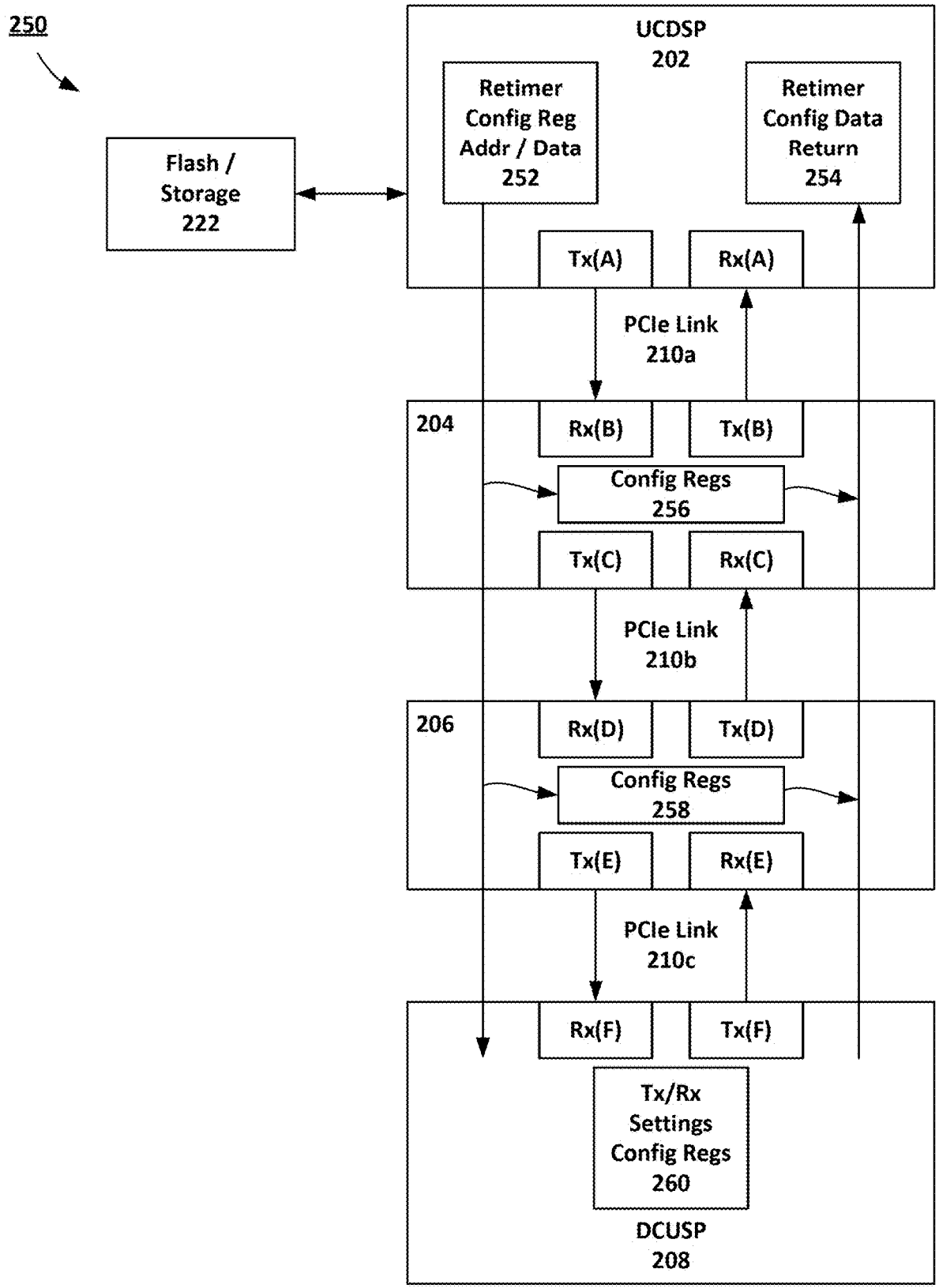

FIG. 2B is a schematic diagram of a connected system 250 that illustrates in-band upstream port and retimer configuration in accordance with embodiments of the present disclosure. As shown in FIG. 2A, an upstream component downstream port 202 can be coupled to the downstream component upstream port 208 by a link 210a-c that is extended by two retimers 204, 206. In this example, the downstream port 202 can be provided with a retimer configuration register address/data register 252 to hold data to be sent in a configuration access command to one of the two retimers using fields of an enhanced SKP OS. One or more bits of the SKP OS can include a command code, data, or an address for use at a configuration register (e.g., 256, 258) of a retimer (e.g., 204, 206, respectively) to read or write data from/to the register 256, 258. Retimers can respond to configuration access commands sent by encoding data in an instance of an enhanced SKP OS by itself encoding response data in a subsequent instance of an enhanced SKP OS. Data encoded by the retimer (e.g., 204, 206) may be extracted at the downstream port and recorded in a retimer configuration data return register (e.g., 254). The registers (e.g., 252, 254) maintained at the upstream device downstream port 202 can be written to and read from by system software and/or other components of the system allowing (indirect) access to the retimer registers: one register (e.g., 252) conveying the address/data/command to the retimer and a second register (e.g., 254) that stores the responses coming back from the re-timer. In other implementations, such registers (e.g., 260) can be maintained at the downstream component upstream port 208 instead of or in addition to the registers being maintained at the upstream component downstream port 202, among other examples.

Continuing with the example of FIG. 2B, in connection with a mechanism for providing in-band access to retimer registers, the retimer may have architected registers that are addressable with well-defined bits and characteristics. In this example, an enhanced SKP OS is defined/modified as the physical layer-generated periodic pattern to carry the commands/information from "Retimer Config Reg Addr/Data" (e.g., 252) to the re-timers and carrying the responses from the re-timers back to load to "Retimer Config Data Return" (e.g., 840), with some bits allotted for CRC for the protection of data. For example, in PCIe this can include enhancing the existing SKP Ordered Set (e.g., with CSR Access and CSR Return (CRC-protected bits)). Further, a flow for ensuring guaranteed delivery of the commands/information to retimer and the corresponding response back can be defined. The physical layer mechanism can be enhanced to also include notifications from the re-timer (in addition to response) if it needs some sort of service, among other examples features.

PCIe Gen 6 (PCI Express 6$^{th}$ Generation) at 64.0 GT/s, CXL 3.0 (Compute Express Link 3$^{rd}$ Generation) at 64.0 GT/s, and CPU-CPU symmetric coherency links such as UPI (Ultra Path Interconnect) at frequencies above 32.0 GT/s (e.g., 48.0 GT/s or 56.0 GT/s or 64.0 GT/s) are examples of interconnects that will need FEC to work in conjunction with CRC. In SoCs, it is highly desirable for the same PHY to be multi-protocol capable and used as PCIe/CXL/UPI depending on the device connected as the Link partner.

In embodiments of this disclosure, multiple protocols (e.g., PCIe, CXL (e.g., CXL 3.0), UPI (e.g., UPI 3.0), etc.) may share a common PHY. Each protocol, however, may have different latency tolerance and bandwidth demands. For example, PCIe may be more tolerant to a latency increase than CXL. CPU-CPU symmetric cache coherent links such as UPI are most sensitive to latency increases.

Links such as PCIe and CXL can be partitioned into smaller independent sub-links. For example, a x16 PCIe/CXL link may be partitioned to up to 8 independent links of x2 each. A symmetric cache coherent link may not support that level of partitioning. Due to the differences in latency characteristics, partitioning support, as well as due to fundamental protocol differences, these links may use different flow control unit (flit) sizes and flit arrangements, even though they may share the same physical layer.

In addition to the differing performance and operating conditions of the various protocols mentioned above, the operating conditions and performance requirements may also change for any given protocol. Operating conditions may have an impact on the error rate and correlation between errors, depending on the system and any variations in the process, voltage, and temperature. Similarly, different applications may have different latency and bandwidth requirements. This disclosure describes mechanisms that can dynamically adjust to these variations.

This disclosure describes a multi-protocol capable PHY that can support different FEC, CRC, and flit sizes dynamically depending on the underlying protocol's performance requirements and operating conditions. A PHY is an abbreviation for "physical layer," and is an electronic circuit that can implement physical layer functions of the OSI model.

This disclosure allows the link to dynamically choose between different FEC, CRC, and flit sizes, independently in each direction, based on the performance needs under the operating conditions. The dynamic selection of FEC, CRC, and flit sizes can be performed autonomously by hardware and/or by hardware with software help.

Figure 3:
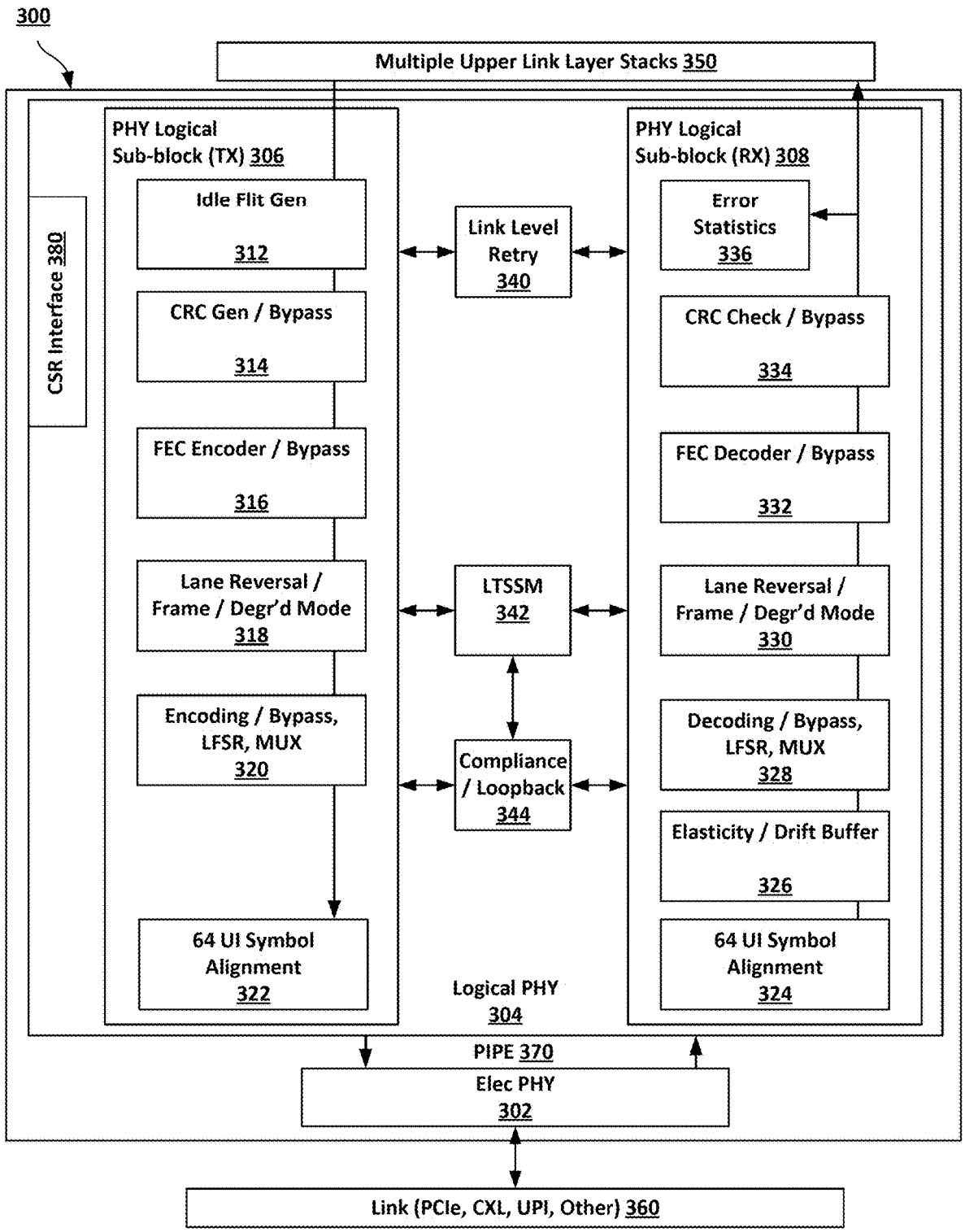
FIG. 3 is a schematic diagram of a common physical layer (common PHY) to support multiple interconnect protocols in accordance with embodiments of the present disclosure.

FIG. 3 is a schematic diagram of a common physical layer (common PHY) 300 to support multiple interconnect protocols in accordance with embodiments of the present disclosure. FIG. 3 illustrates an example common PHY 300 (both analog PHY as well as Logical PHY) with PAM-4 encoding at higher data rates that can support multiple protocols (e.g., PCIe, CXL, UPI, Cache Coherent Interconnect for Accelerators (CCIX), Open Coherent Accelerator Processor Interface (CAPI), etc.) operating at different data rates. Both the analog PHY 302 and the Logical PHY 304 are common to each protocol supported. The analog PHY 302 can support a multi-lane link, such as an x16 PCIe link, with 48 GT/s and 56 GT/s PAM-4 for other interconnect protocols.

The logical PHY 304 can include a TX logical sub-block 306 and an RX logical sub-block 308. The TX logical sub-block 306 can include logic to prepare the data stream for transmission across the link. For example, the TX logical sub-block 306 can include an Idle Flit Generator 312 to generate flits. Flit sizes can be determined based on the protocol, bandwidth, operation conditions, protocol being used, etc. A cyclic redundancy check (CRC) code generator 314 can include one or more CRC code generators and rolling CRC code generators for generating CRC codes. CRC codes are error-detecting codes to detect accidental changes to the data. In embodiments, the CRC code generator 314 can be bypassed while maintaining clock integrity. The TX logical sub-block 306 can also include a forward error correction (FEC) encoder 316, to encode the data with error correcting code (ECC). The FEC encoder 316 can also be bypassed without compromising clock integrity. Other logical elements can also be present in the TX logical sub-block 306, such as lane reversal 318, LFSR 320, symbol alignment 322, etc. The logical PHY can also include a common retry buffer 340, since all the protocols are flit based.

The logical PHY can include an RX logical sub-block 308. RX logical sub-block 308 can include an FEC decoder/bypass 322, CRC decode/bypass 334, and an error reporting element 336. The FEC decoder 332 can decode ECC bits in received data blocks and perform error correction. The CRC decode logic 334 can check for errors that are not correctable and report errors to the error reporting element 336. The retry buffer 340 can be used to signal retry of data blocks with uncorrectable errors. Other logical elements can also be present in the RX logical sub-block 308, such as lane reversal 330, LFSR 328, elasticity/drift buffer 328, symbol alignment 324, etc.

The logical PHY 304 may also include a static mux (not shown in the figure) to choose between the different protocol stacks the PHY 300 supports. The use of a static MUX facilitates reuse of logic elements (including substantial part of what is traditionally a link layer function, such as CRC and Retry), and results in area/power efficiency in addition to the pin efficiency and flexible I/O support (the ability to choose between the different protocol depending on the system configuration). The static mux can direct data towards the appropriate physical and logical elements based on flit size associated with the protocol being used, and direct the data towards the appropriate CRC encoders/decoders and FEC encoders/decoders.

The use of a common PHY 300 (analog PHY 302 plus Logical PHY 304), the flit size, FEC, and CRC can be potentially different between different protocols and operating conditions. Any additional logic to facilitate the common PHY is less costly than replicating the logical PHY stack multiple times for each protocol. Instead, data can be directed electrically to the appropriate encoders/decoders based on the protocol being used, which is set initially during link initialization.

Figure 4:
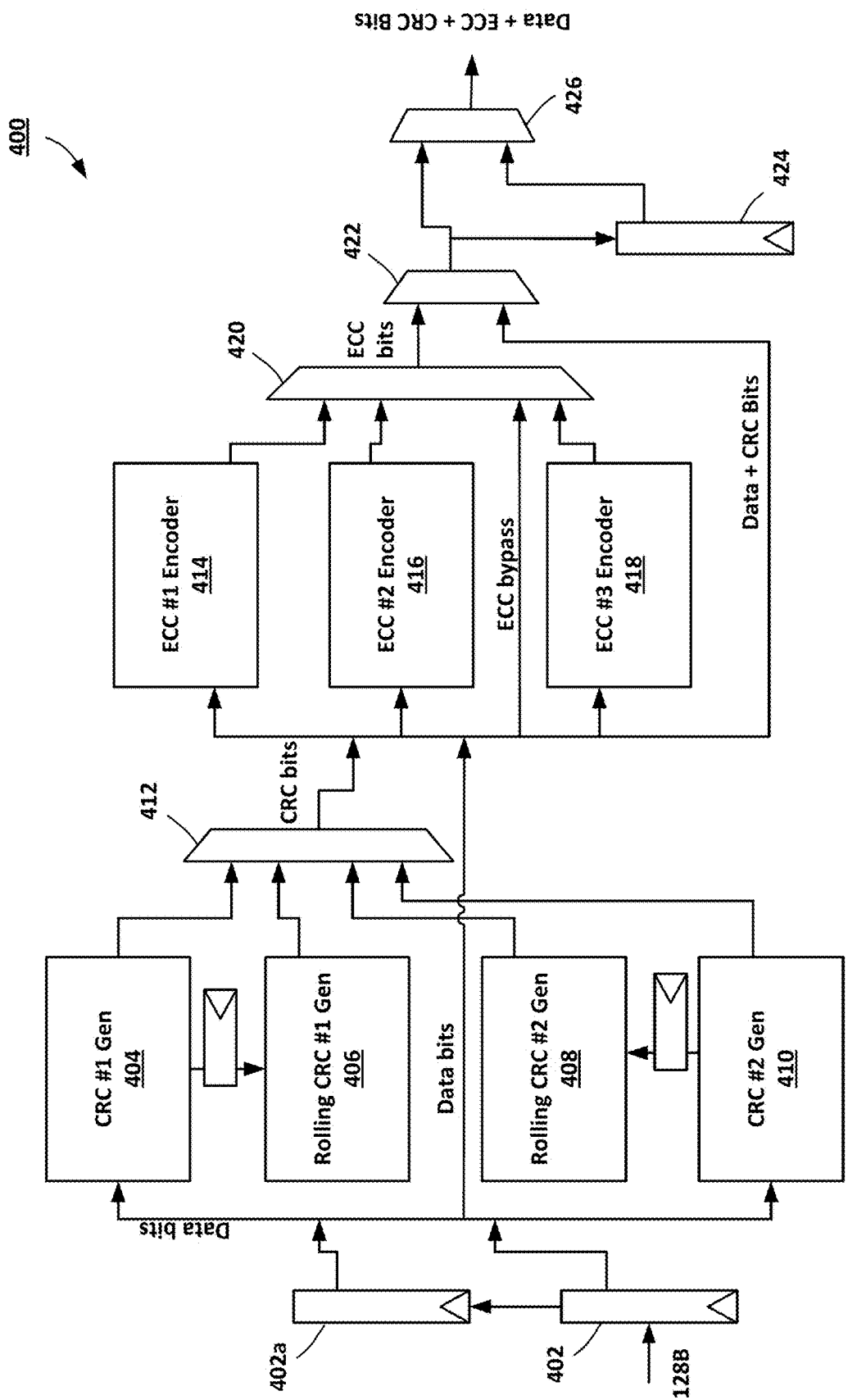
FIG. 4 is a schematic diagram of a transmitter-side logical sub-block of a common PHY in accordance with embodiments of the present disclosure.

FIG. 4 is a schematic diagram of a transmitter-side logical sub-block 400 of a common PHY in accordance with embodiments of the present disclosure. Transmitter-side logical sub-block 400 is similar to the TX logical sub-block 306 described above. FIG. 4 illustrates how data can traverse the transmitter-side logical sub-block 400 based on operating conditions.

As an example, consider two flit sizes: 128B and 256B that can be assigned to different protocols or even the same protocol. For example, PCIe may run with only 256B flit size; CXL may operate either as 128B or as 256B flit size depending on the operating conditions (e.g., a higher error rate may move us towards 256B flit size to better amortize more FEC bits to correct more errors and more CRC bits for a stronger CRC), and UPI may be 128B. The data path, including the ECC and CRC logic, is capable of handling multiple flit sizes. Even though two flit sizes are provided as an example, those skilled in the art will recognize that the techniques work for a single flit size as well as more than two flit sizes.

In this example, the transmitter-side logical sub-block 400 includes two CRC generators: CRC #1 Gen 404 and CR #2 Gen 410. CRC #1 Gen is based on GF(2), which is useful if the errors manifest themselves as independent errors on each lane (i.e., the correlation of errors in a Lane after FEC is low). CRC #2 is based on $GF(2^8)$, which is useful if errors in a lane are bursty. Each CRC generator also has its rolling CRC variation (e.g., Rolling CRC #1 Gen 406 and Rolling CRC #2 Gen 408), where the underlying CRC is not sufficient from a reliability perspective. Rolling CRC generators can generate CRC code based on its respective CRC generator but using a different polynomial of the same order.

A received flit (F1) is accepted only after its CRC is good and the CRC from its subsequent flit (F2), after operating F1 with a different polynomial, is also good. There is also a provision for bypassing the CRC here if the upper layer stack wants to have its own separate check and does not need the CRC decoder in the PHY. Even though in this example, four types of CRCs (two types of CRCs, each with its rolling CRC variant), those skilled in the art will recognize that more or fewer CRCs can be used, depending on the requirements.

Further, in this example, 3 types of FEC encoders are used: ECC #1 414, ECC #2 416, and ECC #3 418. An option to bypass FEC is also provided if the measured error rate is acceptable. For example, the bandwidth demand on the link running a UPI protocol may be such that the link can operate at 48.0 GT/s, and the measured raw burst error rate is $10^{-9}$ at 48.0 GT/s. In that example, FEC can be bypassed, and the CRC with retry is relied on to correct errors, rather than to pay a latency and bandwidth penalty for all flits. Thus, even for any given flit size, the number of bits in the flit that can be used for the data and/or data+control information payload can be different depending on the number of bits used for FEC (0 if we do not use FEC) and the CRC.

ECC #1 414 in this example can be a 3-way interleaved ECC with single symbol correct capability. This type of ECC encoder can be used if the errors in a lane are correlated enough and occur with a burst length of <=16 with a high enough probability to meet the reliability needs. ECC #2 416 can be a double bit correcting BCH code which would be used if precoding with PAM-4 is used and results in a very high percentage of errors in a given lane converting to two bit flips. ECC #2 416 can have the same low-latency characteristics as ECC #1 414 but is more efficient than ECC #1 414. ECC #2 416 can also work well if the burst length is >16. However, ECC #1 414 is a better alternative if the errors after precoding do not result in two bit flips but in multiple bit flips in a lane. ECC #3 418 can be a 2-way interleaved double-Symbol correcting BCH code which will be used if the raw burst error rate is low (i.e., $10^{-4}$-$10^{-5}$ range) since there may be a high probability of multiple symbol errors, even though it has a higher latency penalty than ECC #1 414 or ECC #2 416. Even though in this example, there are three flavors of ECCs, those skilled in the art will recognize that the number of ECCs can be more than three or fewer than three, depending on the requirements.

To accommodate various flit sizes, buffers can be used. For example, for a 128B flit, a single buffer 402, 424 can be used. For a 256B flit, two 128B buffers can be used: 402 and 402a.

Figure 5:
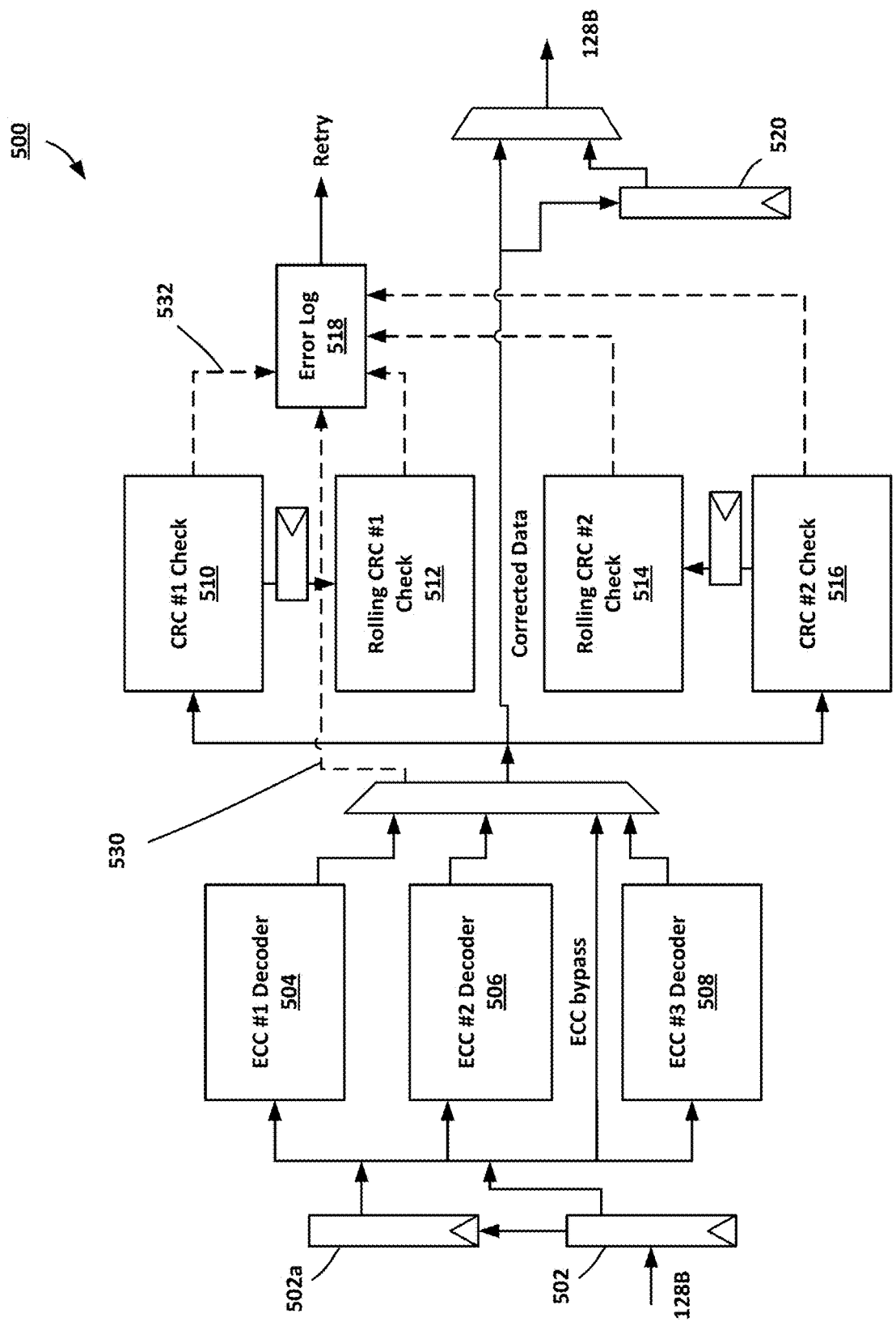
FIG. 5 is a schematic diagram of a receiver-side logical sub-block of a common PHY in accordance with embodiments of the present disclosure.

FIG. 5 is a schematic diagram of a receiver-side logical sub-block 500 of a common PHY in accordance with embodiments of the present disclosure. FIG. 5 demonstrates the receiver side logical sub-block 500, corresponding to the transmitter side logical sub-block 400, described above. Since the receiver-side logical sub-block 500 needs to correct errors and detect any errors that could not be corrected, the receiver-side logical sub-block 500 includes a mechanism to log the errors (error log 518) and invoke a link level retry with its Link partner as needed.

The example receiver-side logical sub-block 500 includes three FEC decoders: ECC #1 decoder 504 corresponding to ECC #1 encoder 414, ECC #2 506 corresponding to ECC #2 encoder 416, and ECC #3 508 corresponding to ECC #3 encoder 416. The ECC decoders can correct for errors. In embodiments, certain errors can be reported to the error log 518 for retry, such as error 530.

The example receiver-side logical sub-block 500 includes four CRC decoders, such as CRC #1 check decoder 510 corresponding to CRC #1 encoder 404, rolling CRC #1 check decoder 512 corresponding to rolling CRC #1 encoder 406, CRC #2 check decoder 516 corresponding to CRC #1 encoder 410, and rolling CRC #2 decoder 514 corresponding to rolling CRC #2 encoder 408. The CRC decoders can determine uncorrectable errors (e.g., error 532), and report the uncorrectable errors to the error log 518 for retry.

Flit sizes are similarly addressed using buffers 502, 502a, and 520.

The Peripheral Component Interconnect Express (PCIe) 6.0 specification introduces a 256 byte Flit size with a 3-way interleaved FEC of 2 bytes each (6 bytes total) and an 8-byte Reed-Solomon code based CRC mechanism. This schema can be used for latency sensitive applications on PCIe-based links with a net latency gain in most cases, especially as the transaction payload sizes increase and latency for narrower link for small payload sizes increase.

Compute Express Link (CXL) and Ultra-Path Interconnect (UPI) technologies will also move to PAM4 signaling using the same (or common) PHY as is described for PCIe 6.0. Latency critical coherency and memory interconnects, such as CXL3 or UPI3, can take advantage of the low-latency FEC mechanism but cannot pay the 256 byte Flit accumulation penalty nor even the 1-2 nanoseconds (ns) of FEC decode overhead.

This disclosure describes mechanisms for keeping the FEC capability at the receiver while operating coherency or memory interconnect protocols with little or no latency addition over the PCIe 6.0 designs in non-return-to-zero (NRZ) mode in many cases and with minimal latency added in others and with minimal bandwidth overhead.

This disclosure describes using a Flit size smaller than 256 bytes. Specifically, a Flit can be broken into portions of halves, each of 128 bytes. A smaller Flit size (e.g., 128B) for coherency and memory protocols can be used with ability to get to 256B Flit size if needed (i.e., link reliability demands it). Each Flit portion will include a six byte CRC, derived from an eight byte CRC polynomial (e.g., as described in the PCIe 6.0 specification), to protect each 128 byte portion. Alternate Flit portions can also include six bytes of error correcting code (ECC) for forward error correction (FEC), which can be used for FEC of the Flit portion that carries the ECC and either the preceding or next Flit portion. In embodiments, a group of Flits can be covered by the six byte ECC in one of the Flit portions.

In some embodiments, Flit portions in accordance with embodiments of the present disclosure can bypass the FEC decoders when no errors are detected by low-latency CRC Different protocols within CXL can use the same Flit mechanisms. For example, CXL.IO can use the same Flit mechanism as CXL.cache and CXL.Mem.

Advantages of the present disclosure are readily apparent to those of skill in the art. Among the advantages include providing little to no latency overhead for the higher data rate transition with PAM-4 signaling, along with low bandwidth overhead for coherency and memory interconnects.

FIGS. 6A-D are schematic block diagrams of example flow control unit (Flit) portion arrangements in accordance with embodiments of the present disclosure. This disclosure describes Flits being apportioned to carry a subset of information. For example, a 256 byte Flit can be portioned into halves, each half flit to include 128 bytes. For ease of describing the embodiments, this disclosure uses the terminology half Flit or Flit half with the understanding that the Flit can be apportioned in other ways. In addition, odd Flit half and an even Flit half can be used to describe the two portions of a Flit, the even Flit half including the first 128 bytes of the Flit and the odd Flit half including the second 128 bytes of the Flit. Examples of various Flit arrangements are shown in FIGS. 6A-D.

The even Flit half contains six bytes of CRC while the odd Flit half contains six bytes of CRC and six bytes of ECC. Each six byte CRC protects its Flit half, while the ECC protects the entire Flit, including the CRC bytes in each Flit half. The even half has a payload of 120 bytes, with the six bytes of CRC (which covers the entire 128 bytes in the even flit half) and two bytes for Flit Management (120 payload+6 CRC+2 FM=128 B). The odd Flit half has a payload of 116 bytes, with six bytes of CRC code and six bytes of FEC (the FEC covers the entire 256 bytes across the two flit halves).

In CXL protocol operation, with switches and end-points supporting multiple domains (or virtual hierarchies), an additional two bytes (or any other number) for switching can be provided per flit half for routing, though the four bytes can be all assigned to the even flit half to have the same 116 bytes for regular flit in each half.

The two Flit halves can belong to different protocols (e.g., CXL.IO, CXL, Cache, CXL.Mem, etc.).

Figure 6:
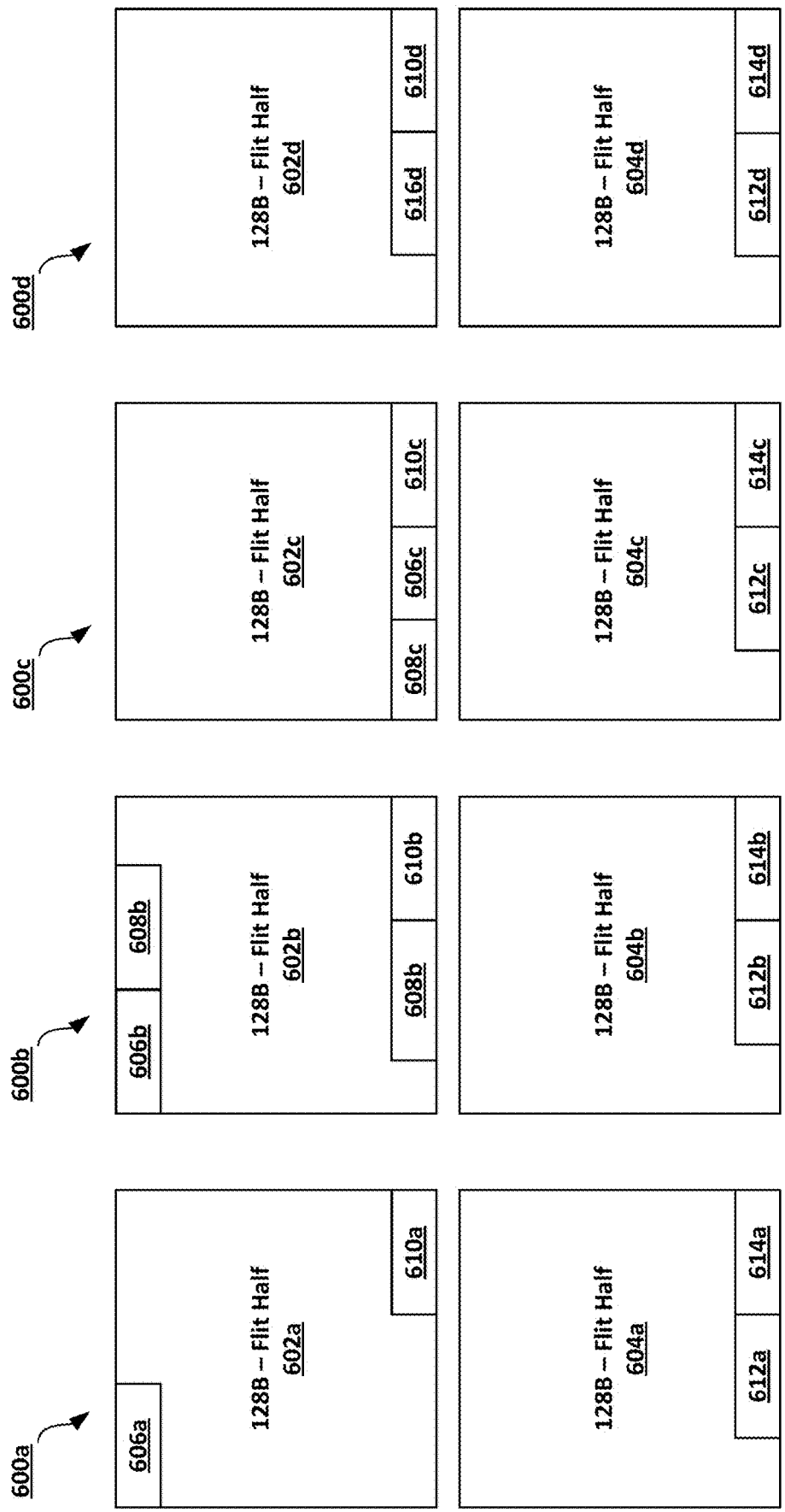
FIGS. 6A-D are schematic block diagrams of example flow control unit (Flit) portion arrangements in accordance with embodiments of the present disclosure.

Example Flit arrangements are illustrated in FIGS. 6A-D. The Flit arrangement can be selected for different types of optimizations. For example, FIG. 6A illustrates a first example Flit arrangement 600a. In Flit arrangement 600, Flit management information 606a in bytes 0 and 1 of the even Flit half 602a. The six bytes of CRC code 610a are at the end of the even Flit half 602a. The odd Flit half 604a includes six bytes of CRC code 612a followed by six bytes of ECC 614a.

FIG. 6B illustrates a second example Flit arrangement 600b. Flit arrangement 600b is similar to 600a in that the Flit management information 606b occupies bits 0 and 1 of the even Flit half 602b. Flit arrangement 600b also includes bytes to allow for switches and endpoints to support multiple domains or virtual hierarchies (switch bits 608b can occupy four consecutive bytes or can be split—two bytes for each Flit half 602b arranged in different parts of the Flit half 602b). The six bytes of CRC code 610b are at the end of the even Flit half 602b. The odd Flit half 604b includes six bytes of CRC code 612b followed by six bytes of ECC 614b.

Flit arrangements 600a and 600b facilitate a receiving port to optimize latency by making routing decisions a-priori. The shifting of payload by two bytes in the even Flit half 602a and 602b in FIGS. 6A and 6B, respectively, would need extra muxes in the path.

In FIG. 6C, the Flit arrangement 600c includes bytes for the switching 608c and the Flit management 606c near the end of the even Flit half 602c. The six bytes of CRC code 610c are at the end of the even Flit half 602c. The odd Flit half 604c includes six bytes of CRC code 612c followed by six bytes of ECC 614c.

In FIG. 6C, the Flit arrangement 600c includes bytes for other overhead 616d. Other overhead can include two bytes 616d for identification, sequence numbering, acknowledgment/negative acknowledgment, etc. The six bytes of CRC code 610d are at the end of the even Flit half 602d. The odd Flit half 604d includes six bytes of CRC code 612d followed by six bytes of ECC 614d.

Flit arrangements can include bytes for two virtual hierarchies, or, as represented in FIGS. 6C and 6D, bytes for one virtual hierarchy.

The Flit Management bits are provided in Table 1.

TABLE 1

Flit Management Information

| Field | Location | Encoding |
|---|---|---|
| Flit Type | 2:0 | 000b: CXL.io<br>001b: CXL.$Mem<br>010b: CLX physical layer packet<br>Rest: Reserved |
| Prior Flit was NULL | 3 | 0b: Prior Flit was a non-NULL Flit<br>1b: Prior Flit was NULL Flit |
| Replay Command | 5:4 | 00b: Ack of Flit Sequence Number from Receiver<br>01b: Nak of Flit Sequence Number from Receiver<br>10b: Nak with a retry request of only the Flit Sequence Number from Receiver<br>11b: Transmitter Sequence Number from Transmitter used for a retried Flit, or ther first Flit afte a retried Flit whose sequence number jumped due to retry of a selected Flit or the Flits initially sent during Configuration. Complete or Recovery. Complete or in L0 while the physical layer is exchanging IDLE Flits |
| Sequence Number | 15:6 | 10-bit sequence number. A Transmitter always starts with a sequence number of 1 when it first enters Configuration. Idle from Detect (assumes Flit mode in all speeds). A sequence number of 0 is only used for initial IDLE Flits - so normal operation (including IDLE Flits after the initial handshake) goes from 1 through 1023. (Can be reduced to 8 or 9 bits if more bits needed for other things.) |

The two bytes for Flit management are shown in Table 1. One can do mix and match of different protocols in the two Flit halves by using additional encoding in the first 3 bits. For example, an encoding of 011b can indicate CXL.io in the even half and CXL.$Mem in the odd half, 100b can indicate CXL.$Mem in the even half and CXL.io in the odd half, etc. For single protocol like UPI, these 3 bits can be used for other purposes. The sequence number covers both halves.

The rationale for a smaller Flit size (128 bytes) than the 256 bytes for PCIe 6.0 for coherency and memory protocols such as CXL 3.0 and UPI 3.0 is the Flit accumulation latency. A receiver has to accumulate an entire Flit and perform the CRC check after FEC to accept the Flit as valid. For a 256 byte Flit operating on a link at 64.0 GT/s, has an accumulation time of 2 ns for a x16, 4 ns for a x8, and 8 ns for a x4 Link. By having the ability to process at 128 bytes, the latencies can be cut by half In the case of CXL, the prior flit size was 68 bytes—so 128 bytes being accumulated in 64.0 GT/s causes a slight improvement in the flit accumulation time. One can take this concept and extend it to smaller flit sizes and pay an even higher overhead in CRC while gaining in latency.

In this disclosure, it is possible for hardware to dynamically shift between the different Flit sizes (256 bytes vs 128 byte) depending on the bandwidth usage. If the bandwidth usage is low and the error rate is below a certain threshold, latency is critical, the system can move to 128 byte half Flits. When the bandwidth usage goes up or the error rate goes above a certain threshold, the system can move to the 256 byte format. This transition can happen as part of the "Flit Management" negotiation during normal traffic transmission and can be effective after the next scheduled SKP Ordered Set. The two directions of the link can be in two different modes.

Figure 7:
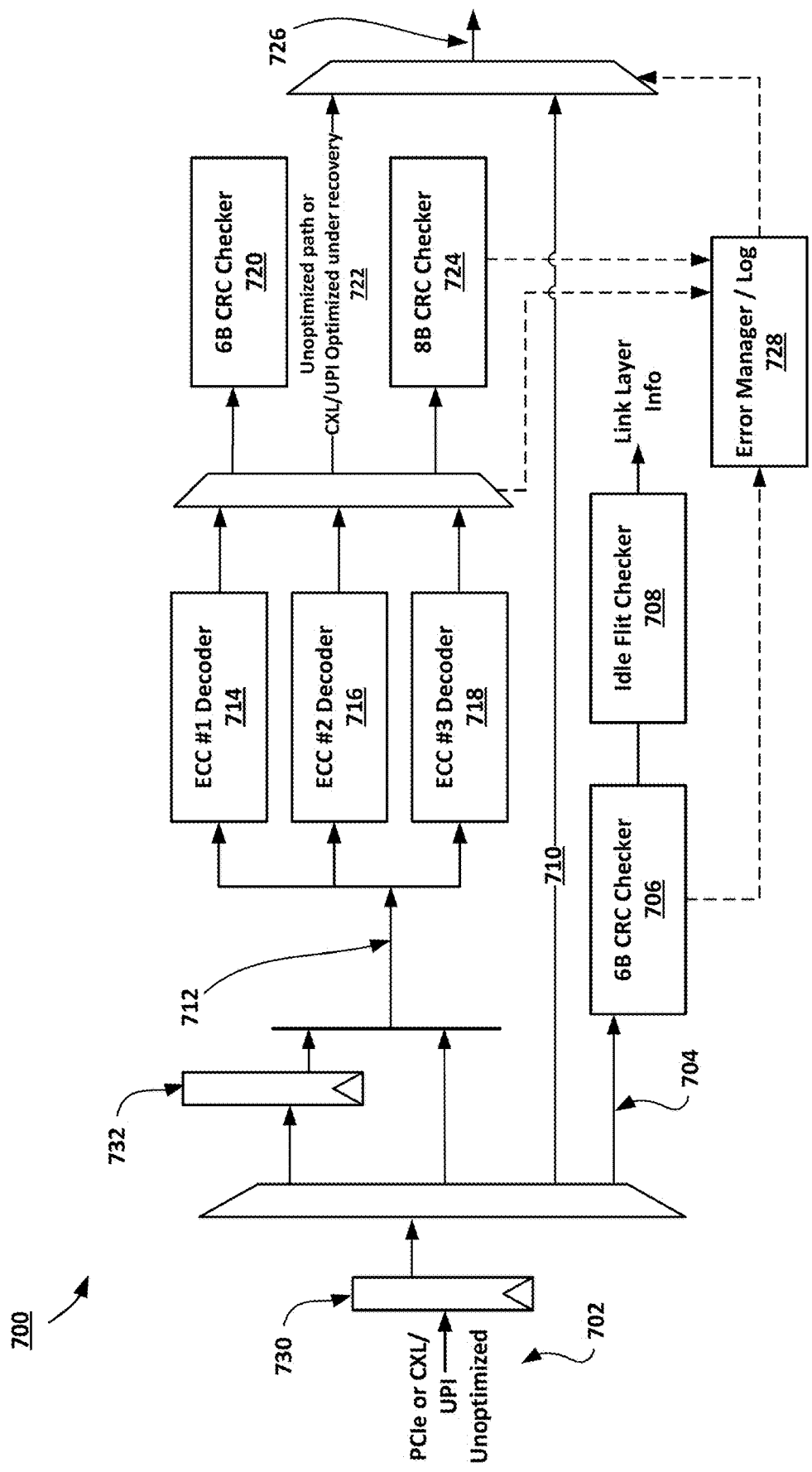
FIG. 7 is a schematic block diagram of an example circuit elements and pathways for low latency and normal-latency pathways in a receiver in accordance with embodiments of the present disclosure.

FIG. 7 is a schematic block diagram of an example receiver 700 with circuit elements and pathways for low latency and normal-latency pathways in a receiver in accordance with embodiments of the present disclosure. For the purpose of this disclosure, two modes are defined: 128 byte Flit mode (low-latency mode) and 256 byte Flit mode (normal latency mode). The receiver 700 can include two pathways: one for the normal latency mode and one for the low-latency mode. The low-latency mode can follow path 710. Path 710 bypasses the FEC decoders circuits 714, 716, 718 and the CRC checker circuits 720 and 724. The path 710 includes a six byte CRC checker circuit 706 to perform CRC check on the 128 byte Flit halves that follow the path 710. The CRC checker circuit 706 generates a six byte CRC code from input 704 (which can include the 128 bytes of Flit half or the 122 bytes without the CRC bytes or the 128 bytes without other overhead).

When 128 byte Flit mode (low-latency mode) is activated, the path 710 includes separate CRC checker circuitry 706 to do the CRC check. If the CRC passes, the Flit half is passed on to upper layers for processing (output 726).

If the CRC checker circuitry 706 fails the Flit half, the Flit half enters normal-latency path 712+722. The two Flit halves (256 bytes) enter the FEC decoder circuits 714, 716, 718. The FEC decoder circuits 714, 716, 718 operate on 256 bytes. After correction, each 128 byte flit half undergoes CRC check by CRC circuitry 720 after the FEC decode. The normal-latency path 712+722 for CXL and UPI and may have an additional 1-2 ns latency over the low-latency path 710.

The normal-latency path 712+722 also includes an eight byte CRC checker circuitry 724 for 256 byte PCIe Flits and Flits for CXL and UPI that include eight byte CRC code.

Once in the normal-latency path 712+722, Flits will follow the normal-latency path 712+722. When an IDLE Flit arrives or the periodic SKP Ordered Set arrives, the normal-latency path 712+722 has sufficient time to process any 256 byte Flits awaiting in the normal-latency path 712+722 (e.g., buffered in buffer 730 or buffer 732). The IDLE Flit or SKP OS can allow the Flits awaiting processing to complete, which will empty the pipeline for the 256 byte data path. All subsequent Flits will then be on the low-latency path 710 (assuming the low-latency path 710 is active). The IDLE Flit can be detected by the IDLE Flit detector 708. Even while operating in normal-latency path, the low-latency path 700 is operating and coordinating with the normal-latency path 712+720 to flip the data path between the two)

When the pathway switches from the low-latency path 710 to the normal-latency path 712+722, the pathway needs to be able to pipeline two flit halves to be processed (i.e., an additional pipelining delay of 2 ns). Once a SKP Ordered Set is received, the SKP OS processing is at least 2 ns long—so any Flit halves in the normal-latency path get cleared (e.g., from buffers 730 or 732), paving the way for the low-latency path 710 to be used. Similarly any IDLE Flit half causes only one Flit half to remain in the normal-latency path.

A receiver can use a half Flit as long as it passes its CRC check. This is because CRC detection is much stronger than the FEC detection capability—so for a link within the specified BER targets, there are no cases where CRC will pass but FEC will catch a bit in error. If the CRC check fails, the FEC decoding and correction is performed and the CRC is checked again (post-correction). If the CRC check passes, the half-flit is processed, else a retry is requested for both flit halves. Flits and half-Flits are processed in order. If a prior flit half did not pass its CRC check after FEC correction, all subsequent Flits could be retried (or at least stored in a temporary buffer).

An error log 728 can be used by either path to log errors.

Figure 8:
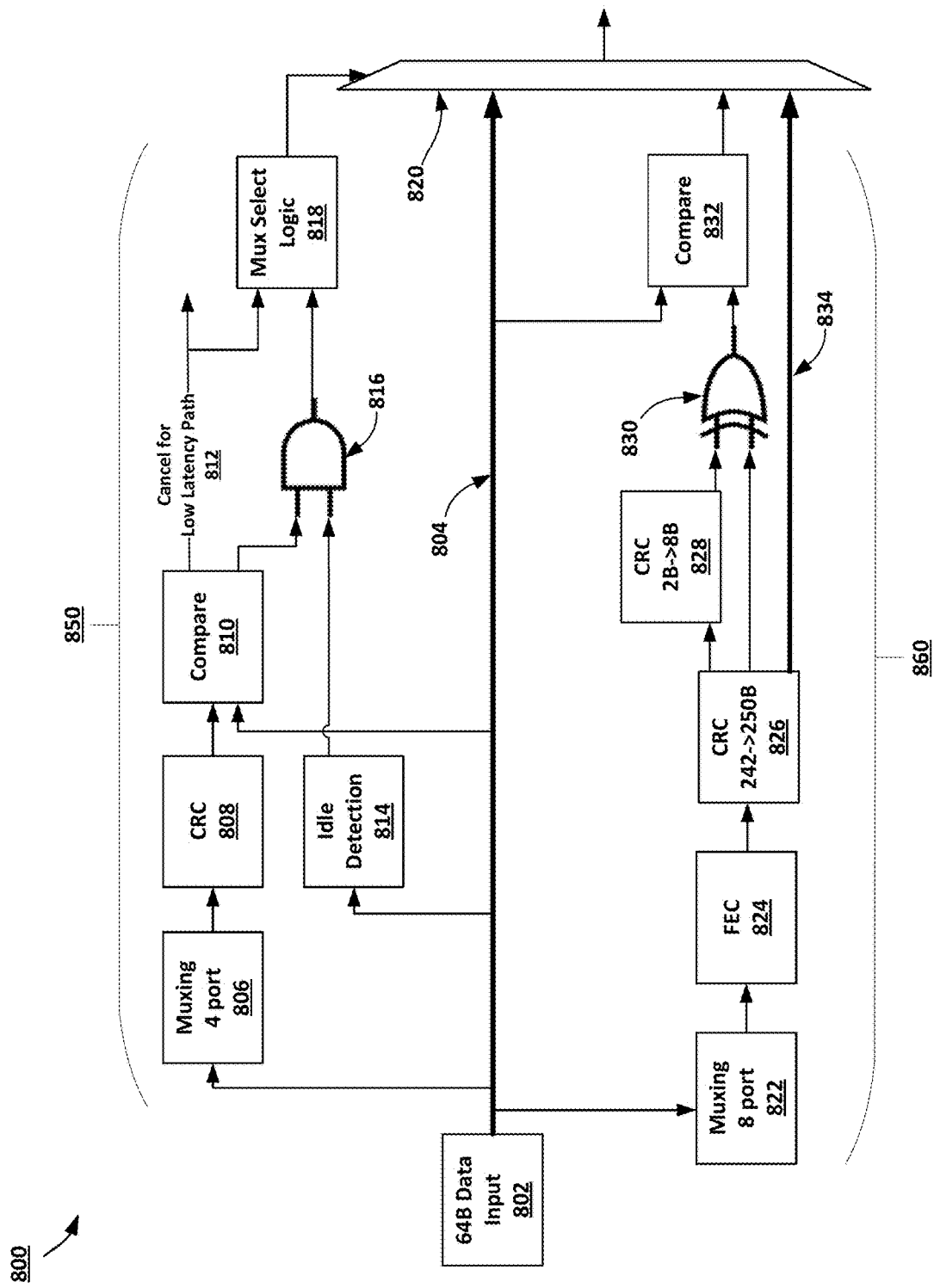
FIG. 8 is a schematic diagram illustrating low latency and normal latency pipelines in a receiver in accordance with embodiments of the present disclosure.

FIG. 8 is a schematic diagram illustrating a receiver 800 with low latency and normal latency pipelines in a receiver in accordance with embodiments of the present disclosure. FIG. 8 shows a pipelined version of the receive paths: the low-latency path 850 and the normal-latency path 860. This example circuit diagram supposes a processing of 64 bytes every cycle at 2 GHz).

The low-latency path 850 uses a six byte CRC generator to generate the six bytes of CRC code when in low-latency mode (for CXL and UPI or other latency-critical or memory interconnect protocol applications). The low-latency path 850 is illustrated as a pipeline 804. (an RC delay and one 2:1 mux inside the path 804 are not shown). The low-latency path 850 is the path taken to completion during the case when there is no CRC errors.

The low-latency path 850 includes a 4 port Mux 806. This path only has corresponding data path muxing 806 for up to 4×4 link subdivision since that is what is supported for CXL.

The low-latency path 850 includes a dedicated CRC generator/check circuitry 808. The CRC generator/check circuitry 808 can include a 124 byte to 130B CRC generator/check circuit (122B of message+2B of zero padding for even flits halves, or {four byte 0 pad+116 byte of payload+two byte 0 pad} for odd flits halves). The CRC generator/check circuitry 808 can include a comparator 810 to compare CRC generated values again CRC values in the Flit half. The output of the comparator 810 can be logically compared against output from IDLE Flit detection circuitry 814 by a logic 816. If a CRC error is detected, the Mux Select Logic 818 can be flipped to cause the receiver to take the normal-latency path 860 (e.g., by output of Mux 820). IDLE Flit detection circuitry 814 can detect and accumulate IDLE Flits to reset the path from normal-latency 860 back to low-latency 850.

If there is a CRC error detected, a cancel indication 812 is issued to the upper layers (this can be 1-2 clock cycles after end of flit indication to the upper layers, and so it relies on the upper layers having the ability to dump the flit and discard any processing that has been performed during this time). The Mux Select logic 818 can flip MUX 820 to take the normal-latency path 850 (which remains there for PCIe logic and processing). If no error is detected (and no IDLE flit detected), the Flit half is passed up to upper layers.

While taking the normal-latency path 860, the low latency CRC circuit 808 is still active along with the IDLE detection circuit 814. Once enough idle flits are accumulated and are at the correct phase of flit transfer, the Mux 820 can be flipped back over to the low-latency path (850) (e.g., by While in the normal latency path 860, the Flit halve can enter through 9 port mux 822. The normal latency path 860 includes FEC circuitry 824, such as three-way intereaving FEC. The normal-latency path 860 uses six byte CRC computation by reusing the eight byte CRC circuit 826 from PCIe along with a small 2B→8B CRC generator 828 to compute the six byte CRC for UPI and CXL modes. CRC check also uses a comparator 832 to compare the generated CRC code with the CRC code carried by the Flit halves.

Figure 9:
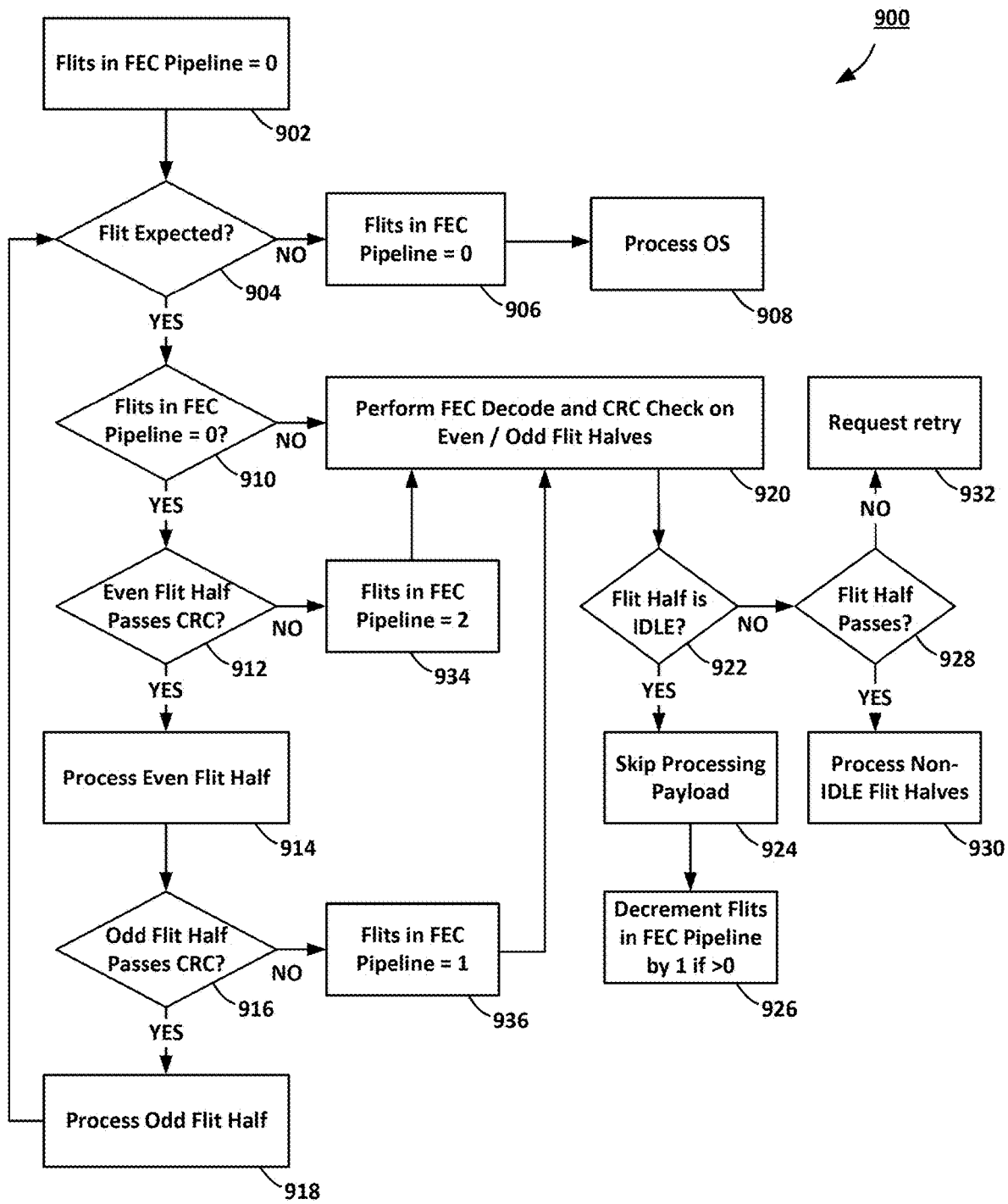
FIG. 9 is a process flow diagram for processing flow control units (Flits) in accordance with embodiments of the present disclosure.

FIG. 9 is a process flow diagram 900 for processing flow control units (Flits) in accordance with embodiments of the present disclosure. At the outset, the Flit in the FEC pipeline value is at zero, which means that there are no Flits or Flit halves awaiting FEC in the normal-latency path. If a Flit is not expected, but an OS is received (904), the Flits in FEC pipeline value remains at 0 (906) and the OS is processed (908).

If a Flit is expected (904), and the Flits in FEC pipeline is at zero (meaning the low-latency path is available), the first Flit portion undergoes CRC check. If the first Flit portion passes CRC check (912), the first Flit portion can be processed (914) and the second Flit portion undergoes CRC check. If the second Flit portion passes CRC check (916), then the second Flit portion can be processed (918). The cycle can start again from (904).

If the first Flit portion does not pass CRC (912), then the Flits in FEC pipeline is set to 2 (934) and both Flit portions are sent to the normal-latency path for FEC check and CRC check (920). FEC is performed on both Flit portions (920). If the first Flit portion passes CRC but the second Flit portion does not pass CRC (916), then the Flits in FEC pipeline is set to 1 (936) and the second Flit portions is sent to the normal-latency path for FEC check and CRC check (920). FEC and CRC are performed on one or both Flit portions (920).

If, while in the normal-latency path, a Flit have contains an IDLE Flit (922), the receiver will skip processing the payload (924) and decrement the Flits in FEC pipeline by 1 if Flits in FEC pipeline>0 (926). If the Flit is not an IDLE Flit, and the Flit half passes FEC and CRC (928), the receiver can process the non-IDLE Flit halves (930). If the Flit half does not pass FEC and CRC (928), then the receiver can request a retry (932).

Figure 10:
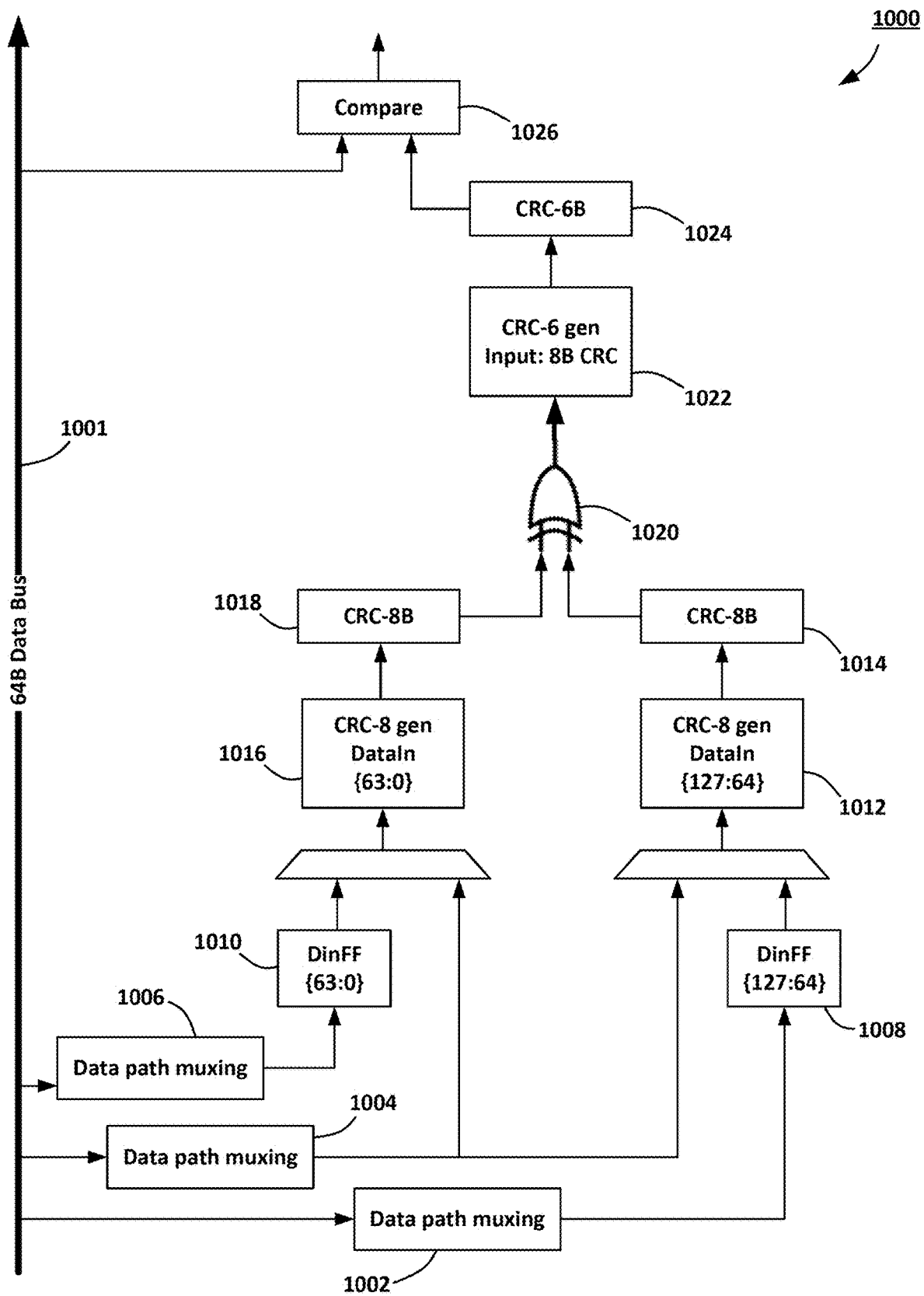
FIG. 10 is a schematic diagram of example circuit elements and pathways for creating cyclic redundancy check code in accordance with embodiments of the present disclosure.

FIG. 10 is a schematic diagram of example circuit elements and pathways for cyclic redundancy check code generation and check 1000 in accordance with embodiments of the present disclosure. FIG. 10 can represent either a transmitter's CRC generation circuitry or a receiver's CRC generation circuitry. Data can be carried by a 64 byte data bus 1001. The information to generate the CRC code enters the circuitry through a series of MUXes 1002, 1004, and 1006. Buffers 1008 and 1010 can temporarily store information to be used for the CRC generation. The CRC generation can make use of eight byte CRC generation logic and circuitry 1016 and 1012. 128 bytes of information can be split into two pathways, with CRC generation logic and circuitry 1016 processing the first 64 bytes and CRC generation logic and circuitry 1012 processing a second 64 bytes. The eight byte CRC 1018 or 1014 is input from an XOR 1020 into a six byte CRC generator 1022. The six byte CRC code 1024 is compared against the CRC code form the Flit half by comparator 1026.

The following provides some example techniques for generating six byte CRC code. The eight byte CRC in PCIe 6.0 uses the polynomial $g(x)=(x+\alpha)(x+\alpha 2) \ldots (x+\alpha 8)$, where a is the root of a primitive polynomial of degree 8. This CRC operates on 242 bytes of data (d[i], where $0<=i<=241$), with CRC being calculated as $\Sigma_{i=0}^{241}[241-i] \cdot x^{\hat{}}(i+8) \mod g(x)$. The CRC logic for a x16 Link is about 25000 gates. In order to leverage these gates, this disclosure describes using the same a with $g'(x)=(x+\alpha)(x+\alpha 2) \ldots (x+\alpha 6)$ and CRC calculation using 2 different methods. The first method has the lowest logic overhead.

6B CRC Option 1:

Six byte CRC generation is defined as $\Sigma_{i=0}^{121 \text{ or } 115} d[121-i] \cdot x^{\hat{}}(i+8) \mod g'(x)$. The choice of eight instead of six inherently assumes there are two bytes in lowest significant bytes that are 0 each and not transmitted. That helps us with reusing the equations. This means that:

$$\Sigma_{i=0}^{121 \text{ or } 115} d[i] \cdot x^{\hat{}}(i+8) \bmod g'(x) = (\Sigma_{i=0}^{121 \text{ or } 115} d[i] \cdot x^{\hat{}}(i+8) \bmod g(x)) \bmod g'(x)$$

The first part $\Sigma_{i=0}^{121 \text{ or } 115} d[i] \cdot x^{\hat{}}x''(i+8) \bmod g(x))$ is calculated using the same CRC logic as the 256 byte path (which is over 242 bytes—zero out the upper 122 or 126 bytes depending on the even or odd 128 byte flit), take the eight bytes of CRC and then apply the mod g'(x) operation on eight bytes only (which is a lot less gates than doing a separate CRC). The numbers 121 and 115 should be treated as examples. There are a whole range of codes possible with different amount of 0 padding before or after the actual message, or even different lengths of message for different applications (for example, we could have done a (124,130) code instead of a (122,128) code). FIG. 10 shows the micro-architectural diagram to accomplish this.

6B CRC Option 2:

For a 8B CRC, if M(x) is the message, the CRC bytes in the code word are given by:

$$CRC\_8B = M(x)*x8 \bmod g(x),$$

where g(x) is the generator polynomial for 8B CRC: $(x+\alpha) \ldots (x+\alpha 8)$.

Thus, an expression can be:

$$M(x)*x8 = q\_1(x)g(x) + r\_1(x) \quad \text{(eq. 1)},$$

where r_1(x) is the polynomial representation of the CRC bytes.

A six byte CRC code can be defined such that the above generated 8B of CRC can be used, and pass it through a six byte CRC generator (this will be much lower area footprint since it is only processing eight byte instead of 122B).

Thus, the six byte CRC can be such that the following property holds true:

$$CRC\_6B = r\_1(x)*x6 \bmod g'(x) \quad \text{(eq. 2)},$$

where g'(x) is the generator polynomial for 6B CRC generation.

From (1) and (2) it can be seen that, given a message M(x), the new six byte CRC code is of the form:

$$CRC\_6B = [M(x)*x8]*x6 \bmod g'(x).$$

M(x)*x8 is generated by taking the 122 bytes of message, and adding 8 bytes of 0s in the LSB. This 130 byte message is passed through a regular 6B CRC generator to generate a 136B code word. The original 122B of message+the 6B CRC bytes are transmitted over the link as the 128B message.

The MATLAB code is given below (Option 2 relevant lines are commented).

```
N = 50000;
B8_POLY = rsgenpoly(255,(255-8),299);
B6_POLY = rsgenpoly(255,(255-6),299);
for i=1:N
    i
    OrigMsg = gf(randi([0,255],1,122),8,299); % create 122 symbol random message
    Code_8BCRC = rsenc(OrigMsg,130,122,B8_POLY);
    Code_8B_crc_bytes = Code_8BCRC(123:130);
    %Code_6B_from_8Bcrc = rsenc(Code_8B_crc_bytes, 14,8,B6_POLY); %6B CRC Option2
    %CRC_6B_Method1 = Code_6B_from_8Bcrc(9:14); %6B CRC Option2
    Code_6B_from_8Bcrc = rsenc(Code_8B_crc_bytes(1:2), 8,2,B6_POLY);
    CRC_6B_Method1 = Code_6B_from_8Bcrc(3:8) + Code_8B_crc_bytes(3:8) ;%this is equivalent of hardware EXOR.
    %6B CRC Option2
    %       Method2_Msg = gf(zeros(1,130),8,299);
    %       Method2_Msg(1:122)=OrigMsg;
    %       Code_6B_method2 = rsenc(Method2_Msg, 136,130,B6_POLY);
    %       CRC_6B_Method2 = Code_6B_method2(131:136);
    %6B CRC Option1
        Method2_Msg = gf(zeros(1,124),8,299);
        Method2_Msg(1:122)=OrigMsg;
        Code_6B_method2 = rsenc(Method2_Msg, 130,124,B6_POLY);
        CRC_6B_Method2 = Code_6B_method2(125:130);
        if (CRC_6B_Method1~=CRC_6B_Method2)
            disp("Mismatch")
            CRC_6B_Method1
            CRC_6B_Method2
            break;
        end
End
```

Figure 11:
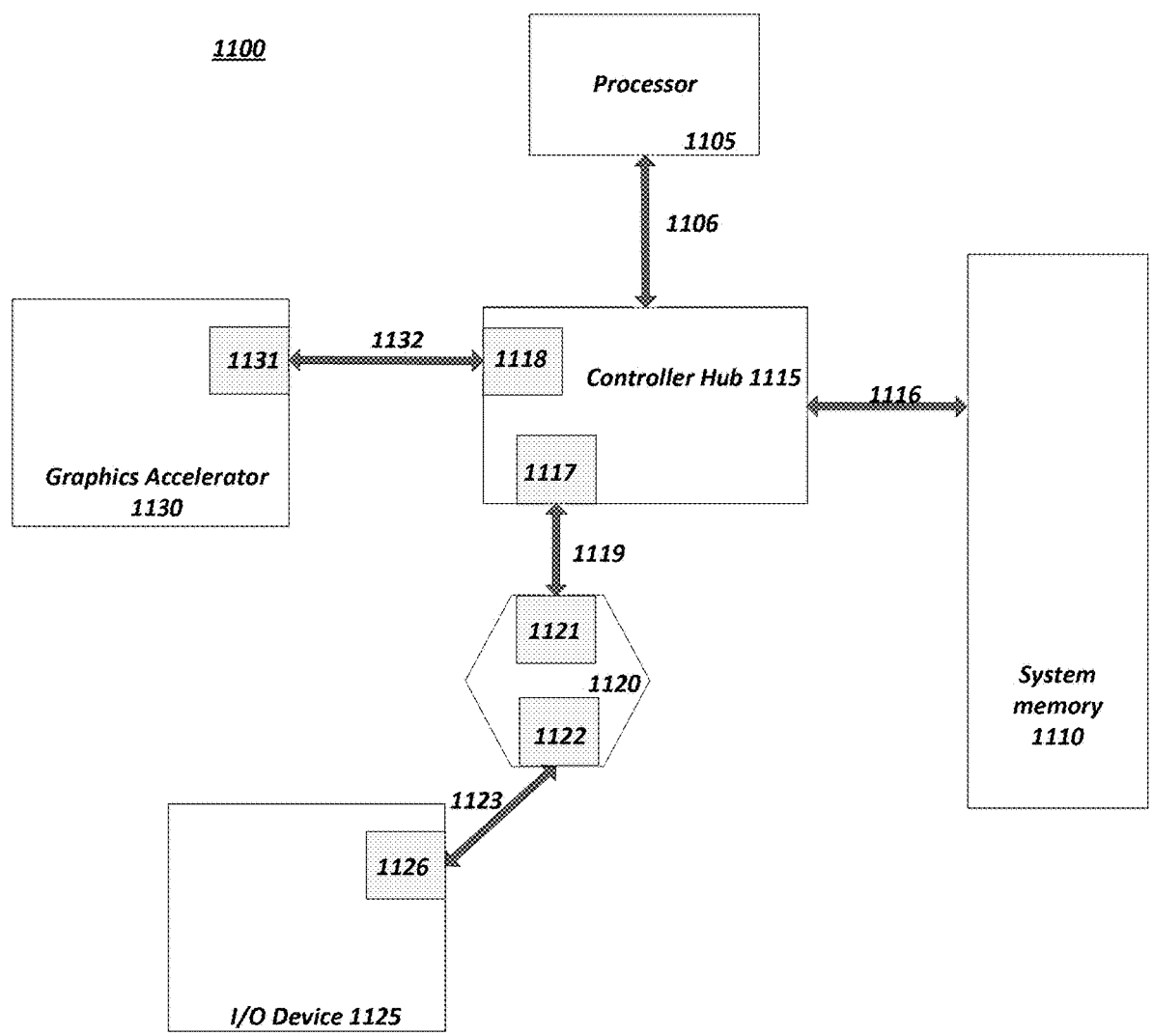
FIG. 11 is a schematic diagram of a simplified block diagram of a system including a serial point-to-point interconnect to connect I/O devices in a computer system in accordance with one embodiment.

Referring to FIG. 11, an embodiment of a fabric composed of point-to-point Links that interconnect a set of components is illustrated. System 1100 includes processor 1105 and system memory 1110 coupled to controller hub 1115. Processor 1105 can include any processing element, such as a microprocessor, a host processor, an embedded processor, a co-processor, or other processor. Processor 1105 is coupled to controller hub 115 through front-side bus (FSB) 1106. In one embodiment, FSB 1106 is a serial point-to-point interconnect as described below. In another embodiment, link 1106 includes a serial, differential interconnect architecture that is compliant with different interconnect standard.

System memory 1110 includes any memory device, such as random access memory (RAM), non-volatile (NV) memory, or other memory accessible by devices in system 1100. System memory 1110 is coupled to controller hub 1115 through memory interface 1116. Examples of a memory interface include a double-data rate (DDR) memory interface, a dual-channel DDR memory interface, and a dynamic RAM (DRAM) memory interface.

In one embodiment, controller hub 1115 can include a root hub, root complex, or root controller, such as in a PCIe interconnection hierarchy. Examples of controller hub 1115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 1105, while controller 1115 is to communicate with I/O devices, in a similar manner as described below. In some embodiments, peer-to-peer routing is optionally supported through root complex 1115.

Here, controller hub 1115 is coupled to switch/bridge 120 through serial link 1119. Input/output modules 1117 and 1121, which may also be referred to as interfaces/ports 1117 and 1121, can include/implement a layered protocol stack to provide communication between controller hub 1115 and switch 1120. In one embodiment, multiple devices are capable of being coupled to switch 1120.

Switch/bridge 1120 routes packets/messages from device 1125 upstream, i.e. up a hierarchy towards a root complex, to controller hub 1115 and downstream, i.e. down a hierarchy away from a root controller, from processor 1105 or system memory 1110 to device 1125. Switch 1120, in one embodiment, is referred to as a logical assembly of multiple virtual PCI-to-PCI bridge devices. Device 1125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 1125 may include a bridge (e.g., a PCIe to PCI/PCI-X bridge) to support legacy or other versions of devices or interconnect fabrics supported by such devices.

Graphics accelerator 130 can also be coupled to controller hub 1115 through serial link 1132. In one embodiment, graphics accelerator 1130 is coupled to an MCH, which is coupled to an ICH. Switch 1120, and accordingly I/O device 1125, is then coupled to the ICH. I/O modules 1131 and 1118 are also to implement a layered protocol stack to communicate between graphics accelerator 1130 and controller hub 1115. Similar to the MCH discussion above, a graphics controller or the graphics accelerator 1130 itself may be integrated in processor 1105.

Figure 12:
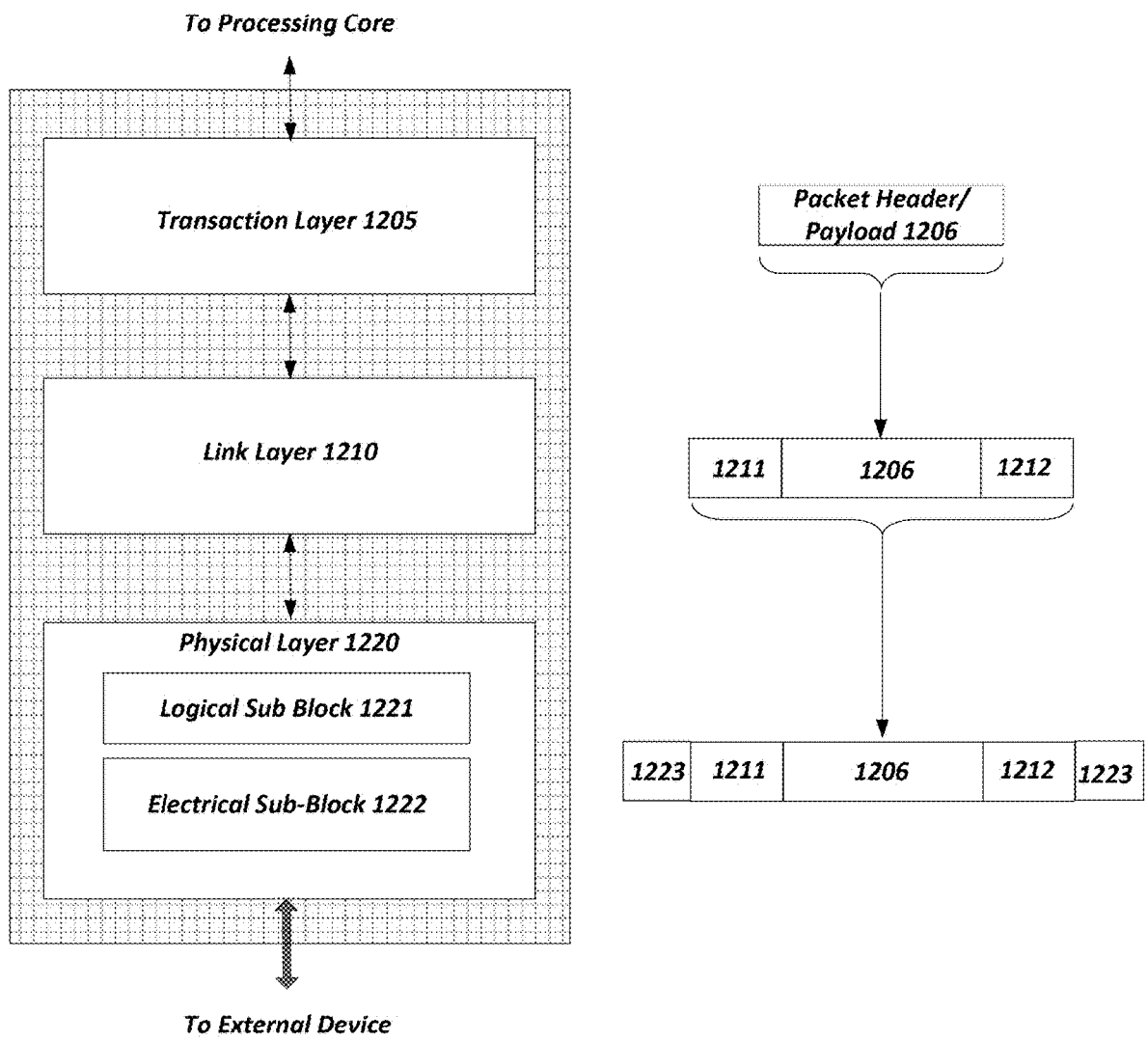
FIG. 12 is a schematic diagram of a simplified block diagram of a layered protocol stack in accordance with one embodiment.

Turning to FIG. 12 an embodiment of a layered protocol stack is illustrated. Layered protocol stack 1200 can includes any form of a layered communication stack, such as a QPI stack, a PCIe stack, a next generation high performance computing interconnect (HPI) stack, or other layered stack. In one embodiment, protocol stack 1200 can include transaction layer 1205, link layer 1210, and physical layer 1220. An interface, such as interfaces 1117, 1118, 1121, 1122, 1126, and 1131 in FIG. 11, may be represented as communication protocol stack 200. Representation as a communication protocol stack may also be referred to as a module or interface implementing/including a protocol stack.

Packets can be used to communicate information between components. Packets can be formed in the Transaction Layer 1205 and Data Link Layer 1210 to carry the information from the transmitting component to the receiving component. As the transmitted packets flow through the other layers, they are extended with additional information used to handle packets at those layers. At the receiving side the reverse process occurs and packets get transformed from their Physical Layer 1220 representation to the Data Link Layer 1210 representation and finally (for Transaction Layer Packets) to the form that can be processed by the Transaction Layer 1205 of the receiving device.

In one embodiment, transaction layer 1205 can provide an interface between a device's processing core and the interconnect architecture, such as Data Link Layer 1210 and Physical Layer 1220. In this regard, a primary responsibility of the transaction layer 1205 can include the assembly and disassembly of packets (i.e., transaction layer packets, or TLPs). The translation layer 1205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 1205. An external device at the opposite end of the link, such as controller hub 1115 in FIG. 11, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 1205 can assemble packet header/payload 1206.

Figure 13:
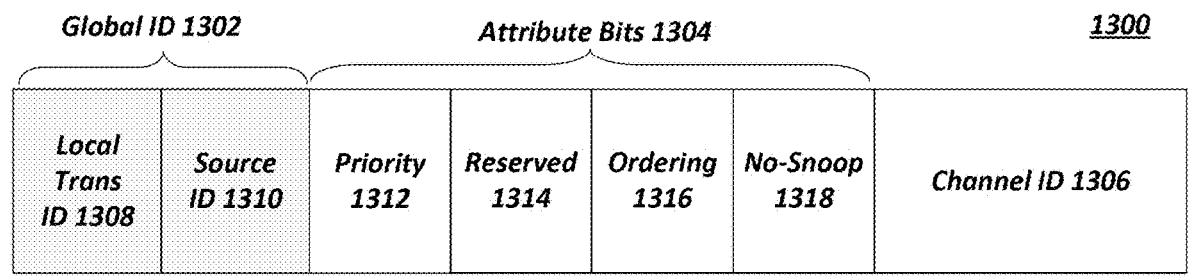
FIG. 13 is a schematic diagram of an embodiment of a transaction descriptor.

Quickly referring to FIG. 13, an example embodiment of a transaction layer packet descriptor is illustrated. In one embodiment, transaction descriptor 1300 can be a mechanism for carrying transaction information. In this regard, transaction descriptor 1300 supports identification of transactions in a system. Other potential uses include tracking modifications of default transaction ordering and association of transaction with channels. For instance, transaction descriptor 1300 can include global identifier field 1302, attributes field 1304, and channel identifier field 1306. In the illustrated example, global identifier field 302 is depicted comprising local transaction identifier field 1308 and source identifier field 1310. In one embodiment, global transaction identifier 1302 is unique for all outstanding requests.

According to one implementation, local transaction identifier field 1308 is a field generated by a requesting agent, and can be unique for all outstanding requests that require a completion for that requesting agent. Furthermore, in this example, source identifier 1310 uniquely identifies the requestor agent within an interconnect hierarchy. Accordingly, together with source ID 1310, local transaction identifier 1308 field provides global identification of a transaction within a hierarchy domain.

Attributes field 1304 specifies characteristics and relationships of the transaction. In this regard, attributes field 1304 is potentially used to provide additional information that allows modification of the default handling of transactions. In one embodiment, attributes field 1304 includes priority field 1312, reserved field 1314, ordering field 1316, and no-snoop field 1318. Here, priority sub-field 1312 may be modified by an initiator to assign a priority to the transaction. Reserved attribute field 1314 is left reserved for future, or vendor-defined usage. Possible usage models using priority or security attributes may be implemented using the reserved attribute field.

In this example, ordering attribute field 1316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1318 is utilized to determine if transactions are snooped. As shown, channel ID Field 1306 identifies a channel that a transaction is associated with.

Returning to the discussion of FIG. 12, a Link layer 1210, also referred to as data link layer 1210, can act as an intermediate stage between transaction layer 1205 and the physical layer 1220. In one embodiment, a responsibility of the data link layer 1210 is providing a reliable mechanism for exchanging Transaction Layer Packets (TLPs) between two components on a link. One side of the Data Link Layer 1210 accepts TLPs assembled by the Transaction Layer 1205, applies packet sequence identifier 1211, i.e., an identification number or packet number, calculates and applies an error detection code, i.e., CRC 1212, and submits the modified TLPs to the Physical Layer 1220 for transmission across a physical to an external device.

In one example, physical layer 1220 includes logical sub block 1221 and electrical sub-block 1222 to physically transmit a packet to an external device. Here, logical sub-block 1221 is responsible for the "digital" functions of Physical Layer 1221. In this regard, the logical sub-block can include a transmit section to prepare outgoing information for transmission by physical sub-block 1222, and a receiver section to identify and prepare received information before passing it to the Link Layer 1210.

Physical block 1222 includes a transmitter and a receiver. The transmitter is supplied by logical sub-block 1221 with symbols, which the transmitter serializes and transmits onto to an external device. The receiver is supplied with serialized symbols from an external device and transforms the received signals into a bit-stream. The bit-stream is de-serialized and supplied to logical sub-block 1221. In one example embodiment, an 8b/10b transmission code is employed, where ten-bit symbols are transmitted/received. Here, special symbols are used to frame a packet with frames 1223. In addition, in one example, the receiver also provides a symbol clock recovered from the incoming serial stream.

As stated above, although transaction layer 1205, link layer 1210, and physical layer 1220 are discussed in reference to a specific embodiment of a protocol stack (such as a PCIe protocol stack), a layered protocol stack is not so limited. In fact, any layered protocol may be included/implemented and adopt features discussed herein. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Figure 14:
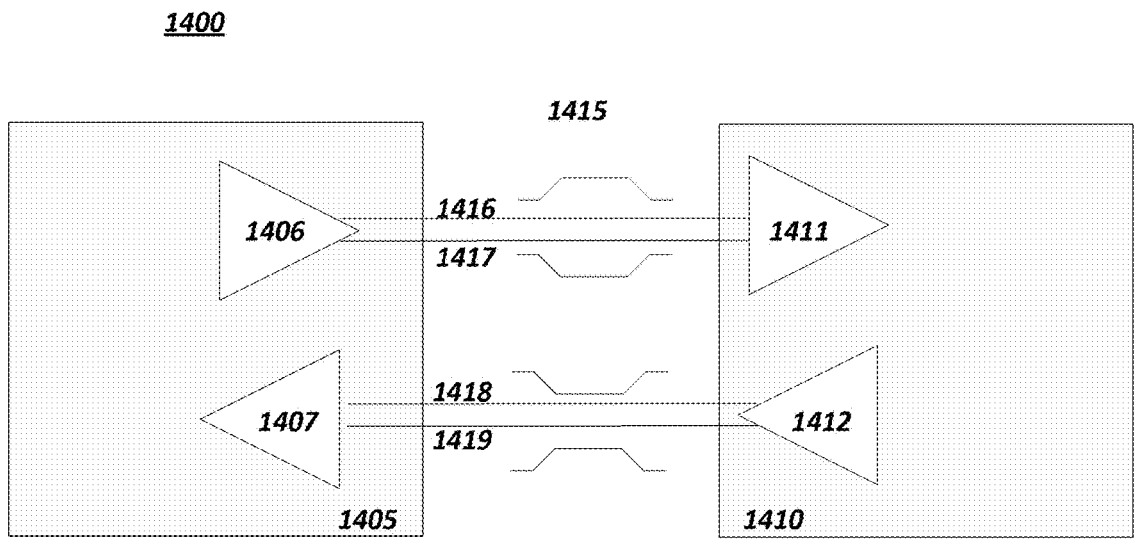
FIG. 14 is a schematic diagram of an embodiment of a serial point-to-point link.

Referring next to FIG. 14, an example embodiment of a serial point to point fabric is illustrated. A serial point-to-point link can include any transmission path for transmitting serial data. In the embodiment shown, a link can include two, low-voltage, differentially driven signal pairs: a transmit pair 1406/1411 and a receive pair 1412/1407. Accordingly, device 1405 includes transmission logic 1406 to transmit data to device 1410 and receiving logic 1407 to receive data from device 1410. In other words, two transmitting paths, i.e. paths 1416 and 1417, and two receiving paths, i.e. paths 1418 and 1419, are included in some implementations of a link.

A transmission path refers to any path for transmitting data, such as a transmission line, a copper line, an optical line, a wireless communication channel, an infrared communication link, or other communication path. A connection between two devices, such as device 1405 and device 1410, is referred to as a link, such as link 1415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 1416 and 1417, to transmit differential signals. As an example, when line 1416 toggles from a low voltage level to a high voltage level, i.e. a rising edge, line 1417 drives from a high logic level to a low logic level, i.e. a falling edge. Differential signals potentially demonstrate better electrical characteristics, such as better signal integrity, i.e. cross-coupling, voltage overshoot/undershoot, ringing, among other example advantages. This allows for a better timing window, which enables faster transmission frequencies.

Compute Express Link (CXL) or other technologies (e.g., GenZ, CAPI, OpenCAPI specification, CCIX, NVLink, etc.) define a general purpose memory interface that allows memory associated with a discrete device, such as an accelerator, to serve as coherent memory. In many cases, the discrete device and associated memory may be a connected card or in a separate chassis from the core processor(s). The result of the introduction of device-associated coherent memory is that device memory is not tightly coupled with the CPU or platform. Platform specific firmware cannot be expected to be aware of the device details. For modularity and interoperability reasons, memory initialization responsibilities must be fairly divided between platform specific firmware and device specific firmware/software.

This disclosure describes an extension to the existing Intel Accelerator Link (CXL) architecture. CXL uses a combination of three separate protocols, known as CXL.io, CXL.cache, and CXL.mem to implement CXL's Bias Based Coherency model (hereinafter, Coherence Bias Model). The Coherence Bias Model can facilitate high performance in accelerators while minimizing coherence overhead. This disclosure provides a mechanism to allow an accelerator to implement the Coherence Bias Model using the CXL.io & CXL.mem protocol (with or without CXL.cache).

CXL.io is a PCIe-compatible input/output (TO) protocol used by CXL for functionalities such as discovery, configuration, initialization, interrupts, error handling, address translation service, etc. CXL.io is non-coherent in nature, supports variable payload sizes and follows PCIe ordering rules. CXL.io is similar in functionality to Intel On-chip System Fabric (IOSF). IOSF is a PCIe protocol repackaged for multiplexing, used for discovery, register access, interrupts, etc.

CXL.mem is an I/O protocol used by the host to access data from a device attached memory. CXL.mem allows a device attached memory to be mapped to the system coherent address space. CXL.mem also has snoop and metadata semantics to manage coherency for device side caches. CXL.mem is similar to SMI3 that controls memory flows.

CXL.cache is an I/O protocol used by the device to request cacheable data from a host attached memory. CXL.cache is non-posted and unordered and supports cacheline granular payload sizes. CXL.cache is similar to the Intra Die Interconnect (IDI) protocol used for coherent requests and memory flows.

This disclosure uses CXL attached memory (CXL.mem protocol) as an example implementation, but can be extended to other technologies as well, such as those proliferated by the GenZ consortium or the CAPI or OpenCAPI specification, CCIX, NVLink, etc. The CXL builds on top of PCIe and adds support for coherent memory attachment. In general, however, the systems, devices, and programs described herein can use other types of input/output buses that facilitate the attachment of coherent memory.

Figure 15:
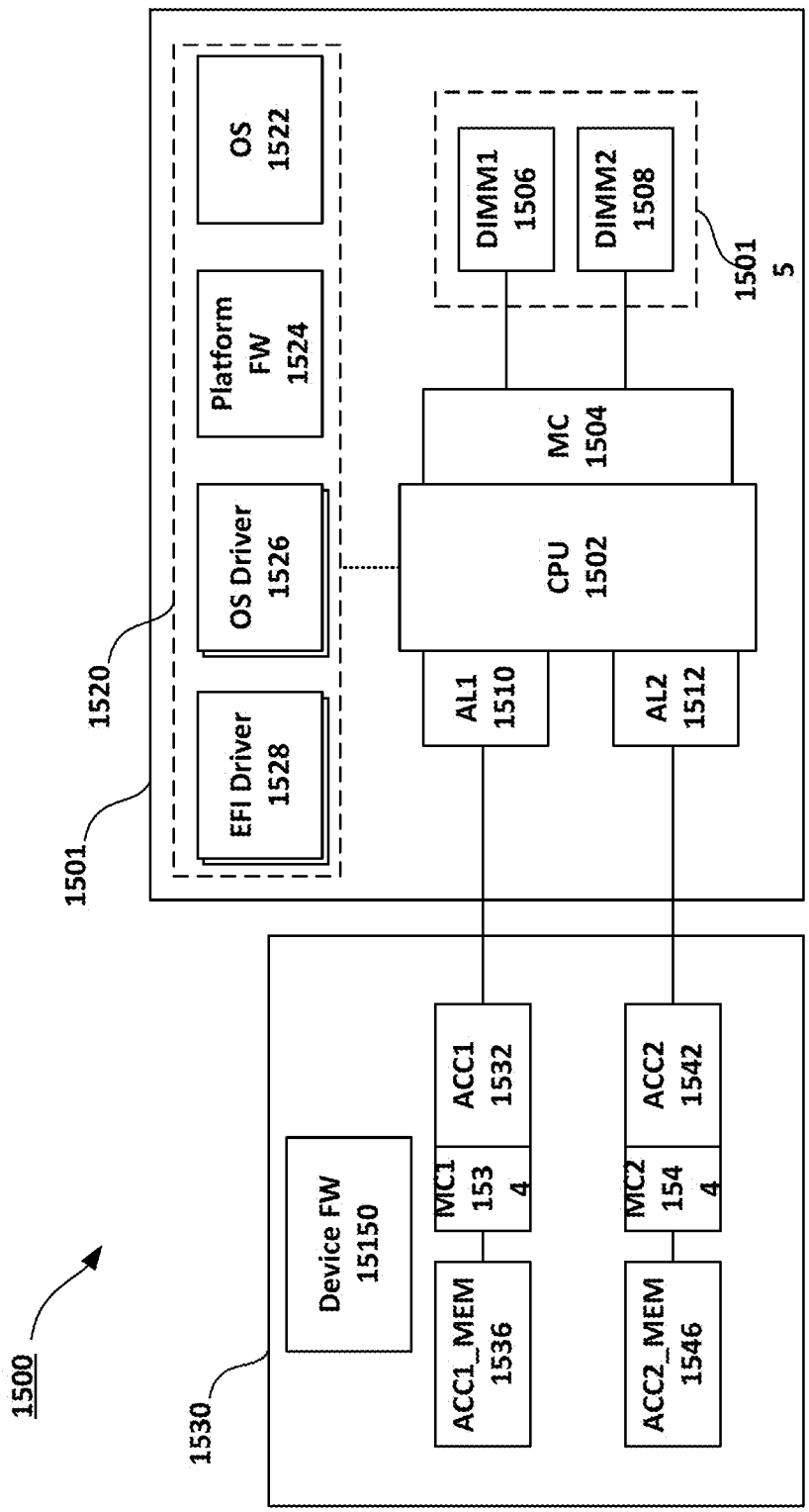
FIG. 15 is a schematic diagram of a processing system that includes a connected accelerator in accordance with embodiments of the present disclosure.

FIG. 15 is a schematic diagram of a processing system 1500 that includes a connected accelerator in accordance with embodiments of the present disclosure. The processing system 1500 can include a host device 1501 and a connected device 1530. The connected device 1530 can be a discrete device connected across a CXL-based interconnect, or by another similar interconnect. The connected device 1530 can be integrated within a same chassis as the host device 1501 or can be housed in a separate chassis.

The host device 1501 can include a processor core 1502 (labelled as CPU 1502). The processor core 1502 can include one or more hardware processors. The processor core 1502 can be coupled to memory module 1505. The memory module 1505 can include double data rate (DDR) interleaved memory, such as dual in-line memory modules DIMM1 1506 and DIMM2 1508, but can include more memory and/or other types of memory, as well. The host device 1501 can include a memory controller 1504 implemented in one or a combination of hardware, software, or firmware. The memory controller 1504 can include logic circuitry to manage the flow of data going to and from the host device 1501 and the memory module 1505.

A connected device 1530 can be coupled to the host device 1501 across an interconnect. As an example, the connected device 1530 can include accelerators ACC1 1532 and ACC2 1542. ACC1 1532 can include a memory controller MC1 1534 that can control a coherent memory ACC1_MEM 1536. ACC2 1542 can include a memory controller MC2 1544 that can control a coherent memory ACC2_MEM 1546. The connected device 1530 can include further accelerators, memories, etc. ACC1_MEM 1536 and ACC2_MEM 1546 can be coherent memory that is used by the host processor; likewise, the memory module 15015 can also be coherent memory. ACC1_MEM 1536 and ACC2_MEM 1546 can be or include host-managed device memory (HDM).

The host device 1501 can include software modules 1520 for performing one or more memory initialization procedures. The software modules 1520 can include an operating system (OS) 1522, platform firmware (FW) 1524, one or more OS drivers 1526, and one or more EFI drivers 1528. The software modules 1520 can include logic embodied on non-transitory machine readable media, and can include instructions that when executed cause the one or more software modules to initialize the coherent memory ACC1_MEM 1536 and ACC2_MEM 1546.

For example, platform firmware 1524 can determine the size of coherent memory ACC1_MEM 1536 and ACC2_MEM 1546 and gross characteristics of memory early during boot-up via standard hardware registers or using Designated Vendor-Specific Extended Capability Register (DVSEC). Platform firmware 1524 maps device memory ACC1_MEM 1536 and ACC2_MEM 1546 into coherent address spaces. Device firmware or software 15150 performs device memory initialization and signals platform firmware 1524 and/or system software 1520 (e.g., OS 1522). Device firmware 15150 then communicates detailed memory characteristics to platform firmware 1524 and/or system software 1520 (e.g., OS 1522) via software protocol.

Figure 16:
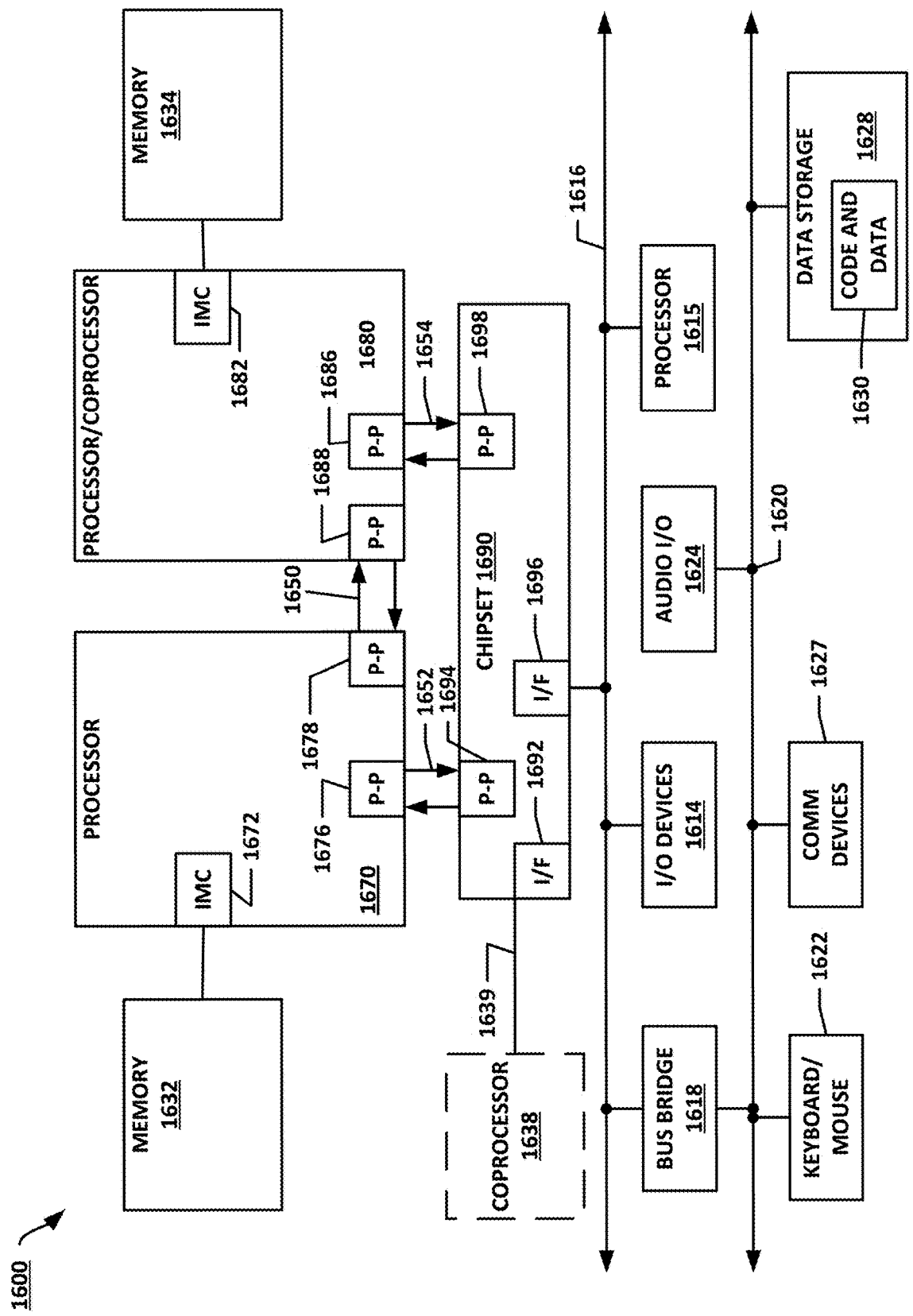
FIG. 16 depicts a block diagram of a first more specific exemplary system in accordance with an embodiment of the present disclosure.

FIG. 16 depicts a block diagram of a first more specific exemplary system 1600 in accordance with an embodiment of the present disclosure. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1000. In one embodiment of the disclosure, processors 1670 and 1680 are respectively processors 1610 and 1615, while coprocessor 1638 is coprocessor 1645. In another embodiment, processors 1670 and 1680 are respectively processor 1610 and coprocessor 1645.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one embodiment, the coprocessor 1638 is a special-purpose processor, such as, for example, a high-throughput MIC processor, a network or communication processor, compression and/or decompression engine, graphics processor, GPGPU, embedded processor, or the like.

A shared cache (not shown) may be included in either processor or outside of both processors, yet connected with the processors via a P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present disclosure is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are contemplated by this disclosure. For example, instead of the point-to-point architecture of FIG. 16, a system may implement a multi-drop bus or other such architecture.

Figure 17:
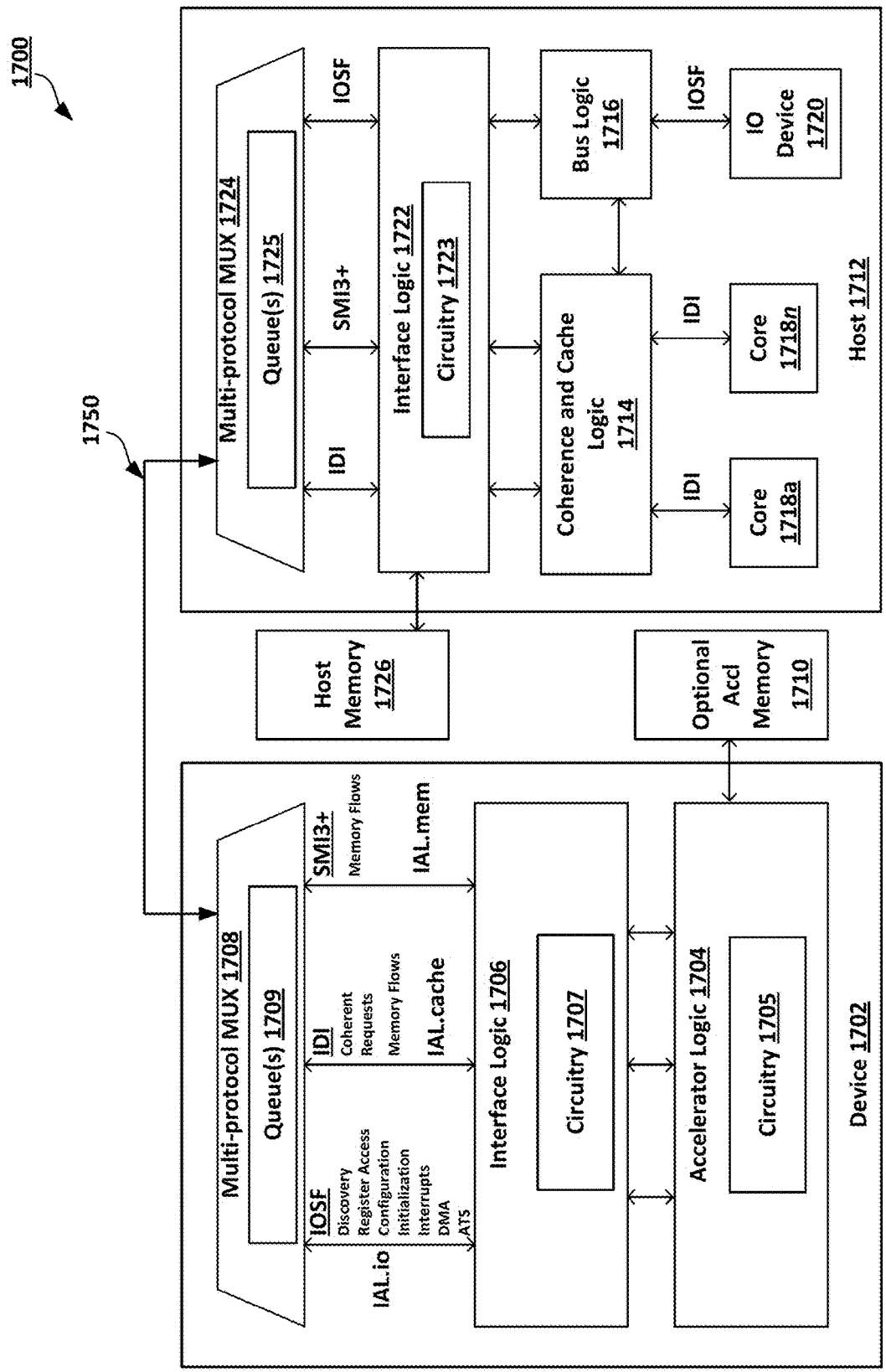
FIG. 17 is a schematic diagram of an example computing system in accordance with embodiments of the present disclosure.

FIG. 17 illustrates an example of an operating environment 1700 that may be representative of various embodiments. The operating environment 1700 depicted in FIG. 17 may include a device 1702 operative to provide processing and/or memory capabilities. For example, device 1702 may be, an accelerator or processor device communicatively coupled to a host processor 1712 via an interconnect 1750, which may be single interconnect, bus, trace, and so forth. The device 1702 and host processor 1712 may communicate over link 1750 to enable data and message to pass there between. In some embodiments, link 1750 may be operable to support multiple protocols and communication of data and messages via the multiple interconnect protocols. For example, the link 1750 may support various interconnect protocols, including, without limitation, a non-coherent interconnect protocol, a coherent interconnect protocol, and a memory interconnects protocol. Non-limiting examples of supported interconnect protocols may include PCI, PCIe, USB, IDI, IOSF, SMI, SMI3, CXL.io, CXL.cache, and CXL.mem, and/or the like. For example, the link 1750 may support a coherent interconnect protocol (for instance, IDI), a memory interconnect protocol (for instance, SMI3), and non-coherent interconnect protocol (for instance, IOSF).

In embodiments, the device 1702 may include accelerator logic 1704 including circuitry 1705. In some instances, the accelerator logic 1704 and circuitry 1705 may provide processing and memory capabilities. In some instances, the accelerator logic 1704 and circuitry 1705 may provide additional processing capabilities in conjunction with the processing capabilities provided by host processor 1712. Examples of device 1702 may include producer-consumer devices, producer-consumer plus devices, software assisted device memory devices, autonomous device memory devices, and giant cache devices, as previously discussed. The accelerator logic 1704 and circuitry 1705 may provide the processing and memory capabilities based on the device. For example, the accelerator logic 1704 and circuitry 1705 may communicate using interconnects using, for example, a coherent interconnect protocol (for instance, IDI) for various functions, such as coherent requests and memory flows with host processor 1712 via interface logic 1706 and circuitry 1707. The interface logic 1706 and circuitry 1707 may determine an interconnect protocol based on the messages and data for communication. In another example, the accelerator logic 1704 and circuitry 1705 may include coherence logic that includes or accesses bias mode information. The accelerator logic 1704 including coherence logic may communicate the access bias mode information and related messages and data with host processor 1712 using a memory interconnect protocol (for instance, SMI3) via the interface logic 1706 and circuitry 1707. The interface logic 1706 and circuitry 1707 may determine to utilize the memory interconnect protocol based on the data and messages for communication.

In some embodiments, the accelerator logic 1704 and circuitry 1705 may include and process instructions utilizing a non-coherent interconnect, such as a fabric-based protocol (for instance, IOSF) and/or a peripheral component interconnect express (PCIe) protocol. In various embodiments, a non-coherent interconnect protocol may be utilized for various functions, including, without limitation, discovery, register access (for instance, registers of device 1702), configuration, initialization, interrupts, direct memory access, and/or address translation services (ATS). Note that the device 1702 may include various accelerator logic 1704 and circuitry 1705 to process information and may be based on the type of device, e.g. producer-consumer devices, producer-consumer plus devices, software assisted device memory devices, autonomous device memory devices, and giant cache devices. Moreover and as previously discussed, depending on the type of device, device 1702 including the interface logic 1706, the circuitry 1707, the protocol queue(s) 1709 and multi-protocol multiplexer 1708 may communicate in accordance with one or more protocols, e.g. non-coherent, coherent, and memory interconnect protocols. Embodiments are not limited in this manner.

In various embodiments, host processor 1712 may be similar to processor 105, as discussed in FIG. 1, and include similar or the same circuitry to provide similar functionality. The host processor 1712 may be operably coupled to host memory 1726 and may include coherence logic (or coherence and cache logic) 1714, which may include a cache hierarchy and have a lower level cache (LLC). Coherence logic 1714 may communicate using various interconnects with interface logic 1722 including circuitry 1723 and one or more cores 1718*a-n*. In some embodiments, the coherence logic 1714 may enable communication via one or more of a coherent interconnect protocol, and a memory interconnect protocol. In some embodiments, the coherent LLC may include a combination of at least a portion of host memory 1726 and accelerator memory 1710. Embodiments are not limited in this manner.

Host processor 1712 may include bus logic 1716, which may be or may include PCIe logic. In various embodiments, bus logic 1716 may communicate over interconnects using a non-coherent interconnect protocol (for instance, IOSF) and/or a peripheral component interconnect express (PCIe or PCI-E) protocol. In various embodiments, host processor 1712 may include a plurality of cores 1718*a-n*, each having a cache. In some embodiments, cores 1718*a-n* may include Intel® Architecture (IA) cores. Each of cores 1718*a-n* may communicate with coherence logic 1714 via interconnects. In some embodiments, the interconnects coupled with the cores 1718*a-n* and the coherence and cache logic 1714 may support a coherent interconnect protocol (for instance, IDI). In various embodiments, the host processor may include a device 1720 operable to communicate with bus logic 1716 over an interconnect. In some embodiments, device 1720 may include an I/O device, such as a PCIe I/O device.

In embodiments, the host processor 1712 may include interface logic 1722 and circuitry 1723 to enable multi-protocol communication between the components of the host processor 1712 and the device 1702. The interface logic 1722 and circuitry 1723 may process and enable communication of messages and data between the host processor 1712 and the device 1702 in accordance with one or more interconnect protocols, e.g. a noncoherent interconnect protocol, a coherent interconnect, protocol, and a memory interconnect protocol, dynamically. In embodiments, the interface logic 1722 and circuitry 1723 may support a single interconnect, link, or bus capable of dynamically processing data and messages in accordance with the plurality of interconnect protocols.

In some embodiments, interface logic 1722 may be coupled to a multi-protocol multiplexer 1724 having one or more protocol queues 1725 to send and receive messages and data with device 1702 including multi-protocol multiplexer 1708 and also having one or more protocol queues 1709. Protocol queues 1709 and 1725 may be protocol specific. Thus, each interconnect protocol may be associated with a particular protocol queue. The interface logic 1722 and circuitry 1723 may process messages and data received from the device 1702 and sent to the device 1702 utilizing the multi-protocol multiplexer 1724. For example, when sending a message, the interface logic 1722 and circuitry 1723 may process the message in accordance with one of interconnect protocols based on the message. The interface logic 1722 and circuitry 1723 may send the message to the multi-protocol multiplexer 1724 and a link controller. The multi-protocol multiplexer 1724 or arbitrator may store the message in a protocol queue 1725, which may be protocol specific. The multi-protocol multiplexer 1724 and link controller may determine when to send the message to the device 1702 based on resource availability in protocol specific protocol queues of protocol queues 1709 at the multi-protocol multiplexer 1708 at device 1702. When receiving a message, the multi-protocol multiplexer 1724 may place the message in a protocol-specific queue of queues 1725 based on the message. The interface logic 1722 and circuitry 1723 may process the message in accordance with one of the interconnect protocols.

In embodiments, the interface logic 1722 and circuitry 1723 may process the messages and data to and from device 1702 dynamically. For example, the interface logic 1722 and circuitry 1723 may determine a message type for each message and determine which interconnect protocol of a plurality of interconnect protocols to process each of the messages. Different interconnect protocols may be utilized to process the messages.

In an example, the interface logic 1722 may detect a message to communicate via the interconnect 1750. In embodiments, the message may have been generated by a core 1718 or another I/O device 1720 and be for communication to a device 1702. The interface logic 1722 may determine a message type for the message, such as a non-coherent message type, a coherent message type, and a memory message type. In one specific example, the interface logic 1722 may determine whether a message, e.g. a request, is an I/O request or a memory request for a coupled device based on a lookup in an address map. If an address associated with the message maps as an I/O request, the interface logic 1722 may process the message utilizing a non-coherent interconnect protocol and send the message to a link controller and the multi-protocol multiplexer 1724 as a non-coherent message for communication to the coupled device. The multi-protocol 1724 may store the message in an interconnect specific queue of protocol queues 1725 and cause the message to be sent to device 1702 when resources are available at device 1702. In another example, the interface logic 1722 may determine an address associated with the message indicates the message is memory request based on a lookup in the address table. The interface logic 1722 may process the message utilizing the memory interconnect protocol and send the message to the link controller and multi-protocol multiplexer 1724 for communication to the coupled device 1702. The multi-protocol multiplexer 1724 may store the message an interconnect protocol-specific queue of protocol queues 1725 and cause the message to be sent to device 1702 when resources are available at device 1702.

In another example, the interface logic 1722 may determine a message is a coherent message based on one or more cache coherency and memory access actions performed. More specifically, the host processor 1712 may receive a coherent message or request that is sourced by the coupled device 1702. One or more of the cache coherency and memory access actions may be performed to process the message and based on these actions; the interface logic 1722 may determine a message sent in response to the request may be a coherent message. The interface logic 1722 may process the message in accordance with the coherent interconnect protocol and send the coherent message to the link controller and multi-protocol multiplexer 1724 to send to the coupled device 1702. The multi-protocol multiplexer 1724 may store the message in an interconnect protocol-specific queue of queues 1725 and cause the message to be sent to device 1702 when resources are available at device 1702. Embodiments are not limited in this manner.

In some embodiments, the interface logic 1722 may determine a message type of a message based on an address associated with the message, an action caused by the message, information within the message, e.g. an identifier, a source of the message, a destination of a message, and so forth. The interface logic 1722 may process received messages based on the determination and send the message to the appropriate component of host processor 1712 for further processing. The interface logic 1722 may process a message to be sent to device 1702 based on the determination and send the message to a link controller (not shown) and multi-protocol multiplexer 1724 for further processing. The message types may be determined for messages both sent and received from or by the host processor 1712.

Figure 18:
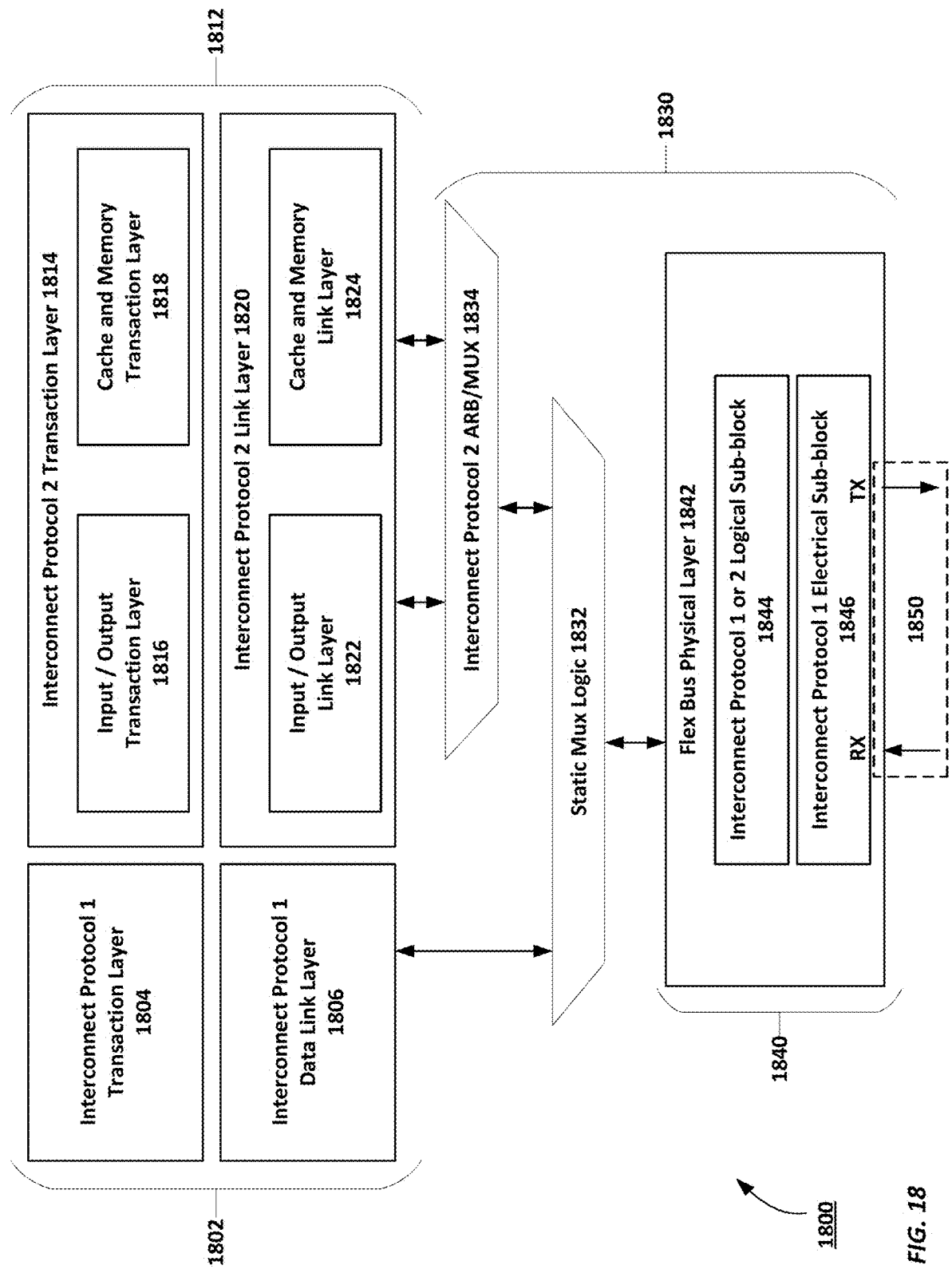
FIG. 18 is a schematic diagram of an example flex bus stack in accordance with embodiments of the present disclosure.

FIG. 18 is a schematic diagram of an example flex bus topology 1800 in accordance with embodiments of the present disclosure. Flex bus topology 1800 illustrates at a high-level various components for supporting multiple protocols across a link (such as a link compliant with a PCIe-based protocol). The flex bus topology 1800 can support either Interconnect Protocol 1 upper layers 1802 or Interconnect Protocol 2 upper layers 1812. In the following example embodiment, Interconnect Protocol 1 1802 is a PCIe-based protocol; and Interconnect Protocol 2 1812 is an accelerator link protocol, such as CXL. The Interconnect Protocol 1 1802 can include an Interconnect Protocol 1 Transaction Layer 1804 and an Interconnect Protocol 1 Link Layer 1806. the Interconnect Protocol 2 1812 can include an Interconnect Protocol 2 Transaction Layer 1814 and an Interconnect Protocol 2 Link Layer 1820. The Interconnect Protocol 2 Transaction Layer 1814 can include an input/output (I/O) transaction layer 1816 (such as an I/O transaction layer to handle CXL.io protocols) and a cache and memory transaction layer 1818 (such as those used to handle CXL.cache and CXL.mem transaction layer protocols). The Interconnect Protocol 2 Link Layer 1820 can include an input/output (I/O) link layer 1822 (such as an I/O link layer to handle CXL.io protocols) and a cache and memory link layer 1824 (such as those used to handle CXL.cache and CXL.mem link layer protocols).

The flex bus topology 1800 can include a fabric 1830 to support the use of different interconnect protocols across a link 1850. The fabric 1830 includes multiplexing (MUX)

logic (static mux logic 1832 and Interconnect Protocol 2 MUX logic 1834) and physical layer logic 1840. During link initialization, the static multiplexing logic 1832 may be configured to select either the PCIe upper layers (e.g., Interconnect Protocol 1 upper layers 1802) or the accelerator link protocol upper layers (e.g., Interconnect Protocol 2 upper layer 1812) to communicate over the link 1850. If, for example, CXL mode is negotiated, MUX 1834, such as, for example, the CXL MUX, may be additionally configured to enable only a single protocol, such as, for example, CXL.io, or to enable multiple protocols, such as, for example, CXL.io dynamically multiplexed with, for example, either CXL.cache or CXL.mem or both (other configurations are contemplated). Finally, also during link initialization, a logical sub-block 1844 of the physical layer logic 1842 may be configured for either PCIe mode or CXL mode. If CXL mode is enabled, any negotiated CXL latency optimizations may also be enabled. This disclosure describes a sequence to be implemented by the physical layer logic 1842 for negotiating which CXL protocols and latency optimization features to enable using the PCIe alternate protocol negotiation mechanism and for subsequently notifying the upper layers so that the appropriate logic may be activated in the flex bus topology 1800 as well as for enabling the appropriate logic in the logical sub-block 1844 and (PCIe) electricals 1844 within the physical layer logic 1842. In general, the fabric 1830 allows a host system to multiplex multiple protocols (e.g., Interconnect Protocol 1 or Interconnect Protocol 2) to be multiplexed onto a set of pins that use electricals associated with a single interconnect protocol (e.g., PCIe).

It is noted that the PCIe 5.0 and 6.0 specifications define modified Training Sequence 1/Training Sequence 2 (TS1/TS2) ordered sets to enable alternate protocol negotiation, allocating vendor defined bits that may be utilized for vendor defined alternate protocol negotiation.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Various aspects and combinations of the embodiments are described above, some of which are represented by the following examples:

Example 1 is an apparatus comprising protocol stack circuitry to encode first information into a first portion of a flow control unit (Flit), determine first cyclic redundancy check (CRC) code for the first information, encode the first CRC code into the first portion of the Flit, encode second information into a second portion of the Flit, determine second CRC code for the second information, and encode the second CRC code into the second portion of the Flit. The apparatus can include a port to transmit the first portion of the Flit and the second portion of the Flit on a link, the link comprising multiple physical lanes.

Example 2 may include the subject matter of example 1, wherein the first CRC code comprises six bytes of the first portion of the Flit and the second CRC code comprises six bytes of the second portion of the Flit.

Example 3 may include the subject matter of any of examples 1 or 2, further comprising protocol stack circuitry to determine error correcting code for the first information and the second information; and encode the ECC for the first information and the second information into the second portion of the Flit.

Example 4 may include the subject matter of example 3, wherein the ECC is to correct errors in the first portion of the Flit and the second portion of the Flit.

Example 5 may include the subject matter of any of examples 3 or 4, wherein the ECC comprises six bytes.

Example 6 may include the subject matter of any of examples 1-4, wherein the first portion of the Flit comprises 128 bytes and the second portion of the flit comprises 128 bytes.

Example 7 may include the subject matter of any of examples 1-5, further comprising protocol stack circuitry to receive, as an input, a first 64 bytes of information; calculate a first eight byte CRC code from the first 64 bytes of information; receive, as an input, a second 64 bytes of information; calculate a second eight byte CRC code from the second 64 bytes of information; and calculate a 6 byte CRC code from the first eight byte CRC code and the second eight byte CRC code.

Example 8 may include the subject matter of any of examples 1-6, further comprising protocol stack circuitry to encode the first portion of the Flit with Flit management information.

Example 9 may include the subject matter of example 7, wherein the Flit management information is encoded in the first two bytes of the first portion of the Flit.

Example 10 may include the subject matter of any of examples 1-8, wherein the first information encoded into the first portion of the Flit corresponds to a first interconnect protocol and the second information encoded in the second portion of the Flit corresponds to a second interconnect protocol different from the first interconnect protocol.

Example 11 is an apparatus comprising a port to receive a first portion of a flow control unit (Flit), the first portion of the Flit comprising first cyclic redundancy check (CRC) code; receive a second portion of the Flit, the second portion of the Flit comprising second CRC code and error correcting code (ECC), the ECC for the first portion of the Flit and the second portion of the Flit; cyclic redundancy check (CRC) circuitry to generate CRC code based on at least part of the first portion of the Flit, and compare the generated CRC code with the first CRC code in the first portion of the Flit; and protocol stack circuitry to send the first portion of the Flit to Link Layer circuitry without performing forward error correction (FEC) if the first portion of the Flit passes a first CRC check, and send the first portion of the Flit and the second portion of the Flit to FEC decoder circuitry for an FEC check if the first portion of the Flit does not pass CRC check.

Example 12 may include the subject matter of example 11, wherein the first CRC code comprises six bytes of the first portion of the Flit.

Example 13 may include the subject matter of any of examples 11 or 12, wherein the CRC circuitry is to generate an eight byte CRC code based, at least in part, on the first portion of the Flit and generate a six byte CRC code based, at least in part, on the eight byte CRC code.

Example 14 may include the subject matter of any of examples 11-13, wherein the CRC circuitry comprises first CRC circuitry; the apparatus further comprises second CRC circuitry; wherein the protocol stack circuitry is to if the first portion of the Flit and the second portion of the Flit pass the FEC check, send the first portion of the Flit and the second portion of the Flit to the second CRC circuitry for a second CRC check.

Example 15 may include the subject matter of example 14, wherein the second CRC circuitry is to generate an eight byte CRC code to perform the second CRC check on the first and second portions of the Flit.

Example 16 may include the subject matter of any of examples 14 or 15, wherein, if the first or second portions of the Flit do not pass the second CRC check, the protocol stack circuitry is to issue a cancel indication to upper layer circuitry and request a retry of the Flit.

Example 17 may include the subject matter of any of examples 14-16, wherein the protocol stack circuitry is to receive an IDLE Flit or a SKIP Ordered Set, and receive a first portion of a second Flit and a second portion of the second Flit; and the CRC circuitry to generate CRC code for first portion of the second Flit, and compare the generated CRC code with CRC code in the first portion of the second Flit; and protocol stack circuitry to send the first portion of the Flit to Link Layer circuitry without performing forward error correction (FEC) if the first portion of the Flit passes a first CRC check, and send the first portion of the second Flit and the second portion of the second Flit to FEC decoder circuitry for an FEC check if the first portion of the second Flit does not pass CRC check.

Example 18 may include the subject matter of any of examples 11-17, wherein protocol stack circuitry to send the second portion of the Flit to Link Layer circuitry without performing forward error correction (FEC) if the second portion of the Flit passes a first CRC check.

Example 19 may include the subject matter of any of examples 11-18, wherein the second portion of the Flit comprises six bytes of CRC code and six bytes of ECC.

Example 20 may include the subject matter of any of examples 11-19, wherein the first portion of the Flit comprises 128 bytes and the second portion of the Flit comprises 128 bytes.

Example 21 is a system comprising transmission-side protocol stack circuitry comprising first cyclic redundancy check (CRC) circuitry to determine first CRC code for a first set of information and to determine second CRC code for a second set of information; Flit encoding circuitry to encode a first portion of a Flit with the first set of information and the first CRC code, the Flit encoding circuitry to encode a second portion of the Flit with the second set of information and the second CRC code; and receiver-side protocol stack circuitry comprising a low-latency path comprising first CRC check circuitry to perform a CRC check on a first portion of a received Flit, and a non-low-latency path. The non-low-latency path comprising forward error correction (FEC) decoder circuitry to perform FEC on received Flits, and second CRC check circuitry to perform CRC check on received Flits that pass FEC check.

Example 22 may include the subject matter of example 21, wherein the transmission-side protocol circuitry comprises forward error correction (FEC) circuitry to determine error correcting code for the first set of information and the second set of information; and the Flit encoding circuitry is to encode the ECC into the second portion of the Flit.

Example 23 may include the subject matter of any of examples 21-22, wherein the first CRC circuitry is to determine a six byte CRC code for the first set of information and a six byte CRC code for the second set of information.

Example 24 may include the subject matter of any of examples 21-23, wherein the receiver-side protocol stack circuitry is to receive a first half of a Flit and a second half of the Flit; the first CRC check circuitry is to perform a first CRC check on the first half of the Flit. If the first half of the Flit fails CRC check, the FEC decoder circuitry is to perform FEC on the first half of the Flit and the second half of the Flit. If the first half of the Flit passes the CRC check, the first CRC check circuitry is to perform a CRC check on the second half of the Flit.

Example 25 may include the subject matter of example 24, wherein, if the first half of the Flit and the second half of the Flit pass FEC check, then the second CRC check circuitry is to perform a CRC check on the first half of the flit and the second half of the Flit. If the first half of the Flit or the second half of the Flit can not be corrected by the FEC decoder circuitry, then the receiver-side protocol stack circuitry can cause a retry of the Flit.

Example 26 is a method that includes receiving a first Flit portion, the first Flit portion comprising 128 total bytes and six bytes of CRC code, performing cyclic redundancy check on the first Flit portion using the six bytes of CRC code, receiving a second Flit portion comprising 128 total bytes and 6 bytes of CRC code, and performing CRC check on the second Flit portion.

Example 27 may include the subject matter of example further comprising, determining that one of the first Flit portion or the second Flit portion fails the CRC check, and performing forward error correction on one or both of the first Flit portion or the second Flit portion.

Example 28 may include the subject matter of any of examples 26 or 27, and may also include receiving an IDLE Flit and causing a next Flit portion to enter a low-latency pathway.

Example 29 may include the subject matter of any of examples 26 or 27, and may also include receiving a SKIP Ordered Set and causing a next Flit portion to enter a low-latency pathway.

Example 30 may include the subject matter of example 27, wherein the second Flit portion includes error correcting code for both the first Flit portion and the second Flit portion.

Example 31 may include the subject matter of any of examples 26-30, and also include generating six byte CRC code to perform CRC check on one or both of the first Flit portion and the second Flit portion.

Example 32 may include the subject matter of example 31, wherein the six byte CRC code is generated from eight byte CRC code.

What is claimed is:

1. An apparatus comprising:
   protocol stack circuitry to:
   encode first information into a first portion of a flow control unit (Flit),
   determine a first six byte (6B) cyclic redundancy check (CRC) code for the first information, the first 6B CRC code based on a first eight byte (8B) CRC code,
   encode the first 6B CRC code into the first portion of the Flit,
   encode second information into a second portion of the Flit,
   determine a second 6B CRC code for the second information, the second 6B CRC code based on a second 8B CRC code, and
   encode the second 6B CRC code into the second portion of the Flit; and
   a port to transmit the first portion of the Flit and the second portion of the Flit on a link, the link comprising multiple physical lanes.

2. The apparatus of claim 1, further comprising protocol stack circuitry to:
   determine error correcting code (ECC) for the first information and the second information; and
   encode the ECC for the first information and the second information into the second portion of the Flit.

3. The apparatus of claim 2, wherein the ECC is to correct errors in the first portion of the Flit and the second portion of the Flit.

4. The apparatus of claim 2, wherein the ECC comprises 6 bytes.

5. The apparatus of claim 1, wherein the first portion of the Flit comprises 128 bytes and the second portion of the flit comprises 128 bytes.

6. The apparatus of claim 1, further comprising protocol stack circuitry to encode the first portion of the Flit with Flit management information.

7. The apparatus of claim 6, wherein the Flit management information is encoded in the first two bytes of the first portion of the Flit.

8. The apparatus of claim 1, wherein the first information encoded into the first portion of the Flit corresponds to a first interconnect protocol and the second information encoded in the second portion of the Flit corresponds to a second interconnect protocol different from the first interconnect protocol.

9. An apparatus comprising:
   a port to:
   receive a first portion of a flow control unit (Flit), the first portion of the Flit comprising first cyclic redundancy check (CRC) code;
   receive a second portion of the Flit, the second portion of the Flit comprising second CRC code and error correcting code (ECC), the ECC for the first portion of the Flit and the second portion of the Flit;
   cyclic redundancy check (CRC) circuitry to:
   generate CRC code based on at least part of the first portion of the Flit, and
   compare the generated CRC code with the first CRC code in the first portion of the Flit; and
   protocol stack circuitry to:
   send the first portion of the Flit to Link Layer circuitry without performing forward error correction (FEC) if the first portion of the Flit passes a first CRC check, and
   send the first portion of the Flit and the second portion of the Flit to FEC decoder circuitry for an FEC check if the first portion of the Flit does not pass CRC check.

10. The apparatus of claim 9, wherein the first CRC code comprises six bytes of the first portion of the Flit.

11. The apparatus of claim 9, wherein the CRC circuitry is to generate an eight byte CRC code based, at least in part, on the first portion of the Flit and generate a six byte CRC code based, at least in part, on the eight byte CRC code.

12. The apparatus of claim 9, wherein the CRC circuitry comprises first CRC circuitry;
   the apparatus further comprises second CRC circuitry;
   wherein the protocol stack circuitry is to:
   if the first portion of the Flit and the second portion of the Flit pass the FEC check, send the first portion of the Flit and the second portion of the Flit to the second CRC circuitry for a second CRC check.

13. The apparatus of claim 12, wherein the second CRC circuitry is to generate an eight byte CRC code to perform the second CRC check on the first and second portions of the Flit.

14. The apparatus of claim 12, wherein, if the first or second portions of the Flit do not pass the second CRC check, the protocol stack circuitry is to issue a cancel indication to upper layer circuitry and request a retry of the Flit.

15. The apparatus of claim 12, wherein the protocol stack circuitry is to:
   receive an IDLE Flit or a SKIP Ordered Set, and
   receive a first portion of a second Flit and a second portion of the second Flit; and
   the CRC circuitry to:
   generate CRC code for first portion of the second Flit, and
   compare the generated CRC code with CRC code in the first portion of the second Flit; and
   protocol stack circuitry to:
   send the first portion of the Flit to Link Layer circuitry without performing forward error correction (FEC) if the first portion of the Flit passes a first CRC check, and
   send the first portion of the second Flit and the second portion of the second Flit to FEC decoder circuitry for an FEC check if the first portion of the second Flit does not pass CRC check.

16. The apparatus of claim 9, wherein protocol stack circuitry to send the second portion of the Flit to Link Layer circuitry without performing forward error correction (FEC) if the second portion of the Flit passes a first CRC check.

17. The apparatus of claim 9, wherein the second portion of the Flit comprises six bytes of CRC code and six bytes of ECC.

18. The apparatus of claim 9, wherein the first portion of the Flit comprises 128 bytes and the second portion of the Flit comprises 128 bytes.

19. A system comprising:
   transmission-side protocol stack circuitry comprising:
   first cyclic redundancy check (CRC) circuitry to determine first CRC code for a first set of information and to determine second CRC code for a second set of information;

Flit encoding circuitry to encode a first portion of a Flit with the first set of information and the first CRC code, the Flit encoding circuitry to encode a second portion of the Flit with the second set of information and the second CRC code;

receiver-side protocol stack circuitry comprising:
- a low-latency path comprising first CRC check circuitry to perform a CRC check on a first portion of a received Flit; and
- a non-low-latency path comprising:
  - forward error correction (FEC) decoder circuitry to perform FEC on received Flits, and
  - second CRC check circuitry to perform CRC check on received Flits that pass FEC.

20. The system of claim 19, wherein the transmission-side protocol circuitry comprises:

forward error correction (FEC) circuitry to determine error correcting code (ECC) for the first set of information and the second set of information; and the Flit encoding circuitry is to encode the ECC into the second portion of the Flit.

21. The system of claim 19, wherein the first CRC circuitry is to determine a six byte CRC code for the first set of information and a six byte CRC code for the second set of information.

22. The system of claim 19, wherein the receiver-side protocol stack circuitry is to receive a first half of a Flit and a second half of the Flit;
- the first CRC check circuitry is to perform a first CRC check on the first half of the Flit;
- if the first half of the Flit fails CRC check,
  - the FEC decoder circuitry is to perform FEC on the first half of the Flit and the second half of the Flit; and
- if the first half of the Flit passes the CRC check, the first CRC check circuitry is to perform a CRC check on the second half of the Flit.

23. The system of claim 22, wherein, if the first half of the Flit and the second half of the Flit pass FEC check, then the second CRC check circuitry is to perform a CRC check on the first half of the flit and the second half of the Flit; and
- if the first half of the Flit or the second half of the Flit can not be corrected by the FEC decoder circuitry, then the receiver-side protocol stack circuitry can cause a retry of the Flit.

* * * * *